United States Patent
Ochiai et al.

(10) Patent No.: US 11,192,386 B2
(45) Date of Patent: Dec. 7, 2021

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventors: Takashi Ochiai, Machida (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/713,334

(22) Filed: Dec. 13, 2019

(65) Prior Publication Data

US 2020/0198365 A1 Jun. 25, 2020

(30) Foreign Application Priority Data

Dec. 21, 2018 (JP) .............................. JP2018-239649

(51) Int. Cl.
*B41J 2/21* (2006.01)
*B41J 19/14* (2006.01)

(52) U.S. Cl.
CPC ........... *B41J 2/2139* (2013.01); *B41J 2/2135* (2013.01); *B41J 2/2142* (2013.01); *B41J 19/145* (2013.01)

(58) Field of Classification Search
CPC ....... B41J 2/2139; B41J 2/2135; B41J 2/2142
See application file for complete search history.

(56) References Cited

U.S. PATENT DOCUMENTS

| | | |
|---|---|---|
| 9,150,012 B2 | 10/2015 | Ochiai et al. |
| 9,201,839 B2 | 12/2015 | Hara et al. |
| 9,462,091 B2 | 10/2016 | Hara et al. |
| 9,485,388 B2 | 11/2016 | Kodama et al. |
| 9,734,439 B2 | 8/2017 | Hara et al. |
| 9,749,496 B2 | 8/2017 | Fujimoto et al. |
| 10,027,848 B2 | 7/2018 | Fuse et al. |

(Continued)

FOREIGN PATENT DOCUMENTS

| | | |
|---|---|---|
| CN | 1824513 A | 8/2006 |
| CN | 1944058 A | 4/2007 |

(Continued)

OTHER PUBLICATIONS

Extended European Search Report issued by the European Patent Office dated May 7, 2020 in corresponding European Patent Application No. 19216957.1.

(Continued)

*Primary Examiner* — Jason S Uhlenhake
(74) *Attorney, Agent, or Firm* — Carter, DeLuca & Farrell LLP

(57) ABSTRACT

To predict more accurately whether ink dots formed on the surface of paper by two nozzles arranged in a nozzle row and located at positions close to each other overlap. A luminance amount for each unit area surrounding each chart is derived from scanned data obtained by reading results of printing a plurality of charts (two-dot line chart corresponding to a nozzle pair of a nozzle of interest and a neighboring nozzle thereof among the plurality of nozzles) associated with a plurality of nozzles respectively. Then, based on the luminance amount for each unit area, the dot formation state in a dot formation line by the plurality of nozzles is determined.

18 Claims, 17 Drawing Sheets

(56) References Cited

U.S. PATENT DOCUMENTS

| | | |
|---|---|---|
| 10,043,118 B2 | 8/2018 | Sumi et al. |
| 10,057,459 B2 | 8/2018 | Yamamoto et al. |
| 10,063,743 B2 | 8/2018 | Fuse et al. |
| 10,073,370 B2 | 9/2018 | Takikawa et al. |
| 10,187,553 B2 | 1/2019 | Takesue et al. |
| 10,194,053 B2 | 1/2019 | Otani et al. |
| 10,356,282 B2 | 7/2019 | Ochiai et al. |
| 10,506,135 B2 | 12/2019 | Moribe et al. |
| 2006/0274106 A1* | 12/2006 | Park .............. B41J 29/393 347/19 |
| 2011/0316921 A1* | 12/2011 | Azuma ............. H04N 1/405 347/15 |
| 2015/0278647 A1* | 10/2015 | Iwaishi ............ B41J 2/2146 358/1.14 |
| 2017/0057265 A1* | 3/2017 | Tsukada ........... H04N 1/0083 |
| 2017/0139363 A1 | 5/2017 | Takikawa et al. |
| 2018/0295258 A1 | 10/2018 | Ochiai et al. |
| 2019/0156164 A1 | 5/2019 | Yanai et al. |
| 2019/0362202 A1 | 11/2019 | Kikuta et al. |
| 2020/0074251 A1 | 3/2020 | Takesue et al. |
| 2020/0079102 A1 | 3/2020 | Ochiai et al. |
| 2020/0156386 A1 | 5/2020 | Otani et al. |
| 2020/0171820 A1 | 6/2020 | Takesue et al. |
| 2020/0184289 A1 | 6/2020 | Takesue et al. |
| 2020/0204705 A1 | 6/2020 | Hashioka et al. |

FOREIGN PATENT DOCUMENTS

| | | |
|---|---|---|
| CN | 102161260 A | 8/2011 |
| CN | 102442058 A | 5/2012 |
| CN | 102442063 A | 5/2012 |
| JP | 2006-240060 A | 9/2006 |

OTHER PUBLICATIONS

Notice on the First Office Action issued by the National Intellectual Property Administration of the People's Republic of China dated Sep. 3, 2021 in corresponding CN Patent Application No. 201911325371.6, with English translation.

* cited by examiner

IMAGE PROCESSING APPARATUS, IMAGE PROCESSING METHOD AND STORAGE MEDIUM

BACKGROUND OF THE INVENTION

Field of the Invention

The present invention relates to a technique to determine an overlapping state of dots on the surface of paper in a case where image printing is performed by an ink jet method.

Description of the Related Art

A single-pass method in which an image is formed by causing a print head to perform a relative scan only once for a predetermined area of a printing medium (sheet) is capable of high-speed printing compared to a multi-pass method in which an image is formed by causing a print head to perform a scan a plurality of times for a predetermined area.

Then, in a case where the single-pass method is adopted in a so-called ink jet printer, there is a possibility that a white streak appears along the conveyance direction of a printing medium because ink dots that should overlap originally do not overlap on the surface of paper. In particular, in a case where the ink droplet landing position largely shifts with respect to the nozzle row direction (direction intersecting the conveyance direction of the printing medium) or in a case where the dot diameter is extremely smaller than supposed, the above-described white streak is likely to occur. For example, in a case of a print head whose resolution is 1,200 dpi and the length of the nozzle row of which is ten inches, there are 12,000 nozzles in one nozzle row, and therefore, it is difficult to ideally control the landing position and the dot diameter of each ink droplet by such an enormous number of nozzles.

As a measure against this, Japanese Patent Laid-Open No. 2006-240060 has disclosed an image correction method of correcting input image data by acquiring a test pattern printed by one nozzle as optical density information for each position in the nozzle row direction and calculating the degree of influence of coloring in each nozzle. According to this method, it is possible to perform correction equivalent thereto more easily without having to directly calculate the ejection characteristic of the ink drop for each nozzle, such as the dot shift and the dot diameter.

Whether the ink dots formed by two nozzles arranged in the nozzle row and located at positions close to each other overlap on the surface of paper largely affects the dot shape and the ink fixing state and this directly relates to print quality. Consequently it is important to accurately predict whether the ink dots formed by two nozzle arranged in the nozzle row and located at positions close to each other overlap actually on the surface of paper and it is made possible to take a more appropriate measure by accurately predicting the dot formation state. Regarding this point, the method of Japanese Patent Laid-Open No. 2006-240060 described above in which the influence of coloring by an adjacent nozzle on a nozzle of interest is predicted from measurement data of the test pattern printed by one nozzle has a limit to the prediction accuracy.

Consequently, an object of the technique according to the present disclosure is to more accurately predict whether ink dots formed on the surface of paper by a plurality of nozzles arranged in the nozzle row and located at positions close to one another overlap.

SUMMARY OF THE INVENTION

The image processing apparatus according to the present disclosure is an image processing apparatus that performs processing relating to generation of dot data specifying on or off of a dot in each pixel, the dot data being used for formation of an image by a printer forming the image on a printing medium by ejecting ink from a plurality nozzles, and includes: a derivation unit configured to derive, from first scanned data obtained by reading results of printing a plurality of first charts associated with a plurality of nozzles of interest among the plurality of nozzles respectively, a luminance amount for each unit area surrounding each of the first charts; and a determination unit configured to determine a dot formation state in a dot formation line by the plurality of nozzles based on the luminance amount for each unit area, and the first chart is a line chart having a width of two dots, the line chart in which a line corresponding to the nozzle of interest and a line corresponding to a neighboring nozzle of the nozzle of interest are adjacent.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
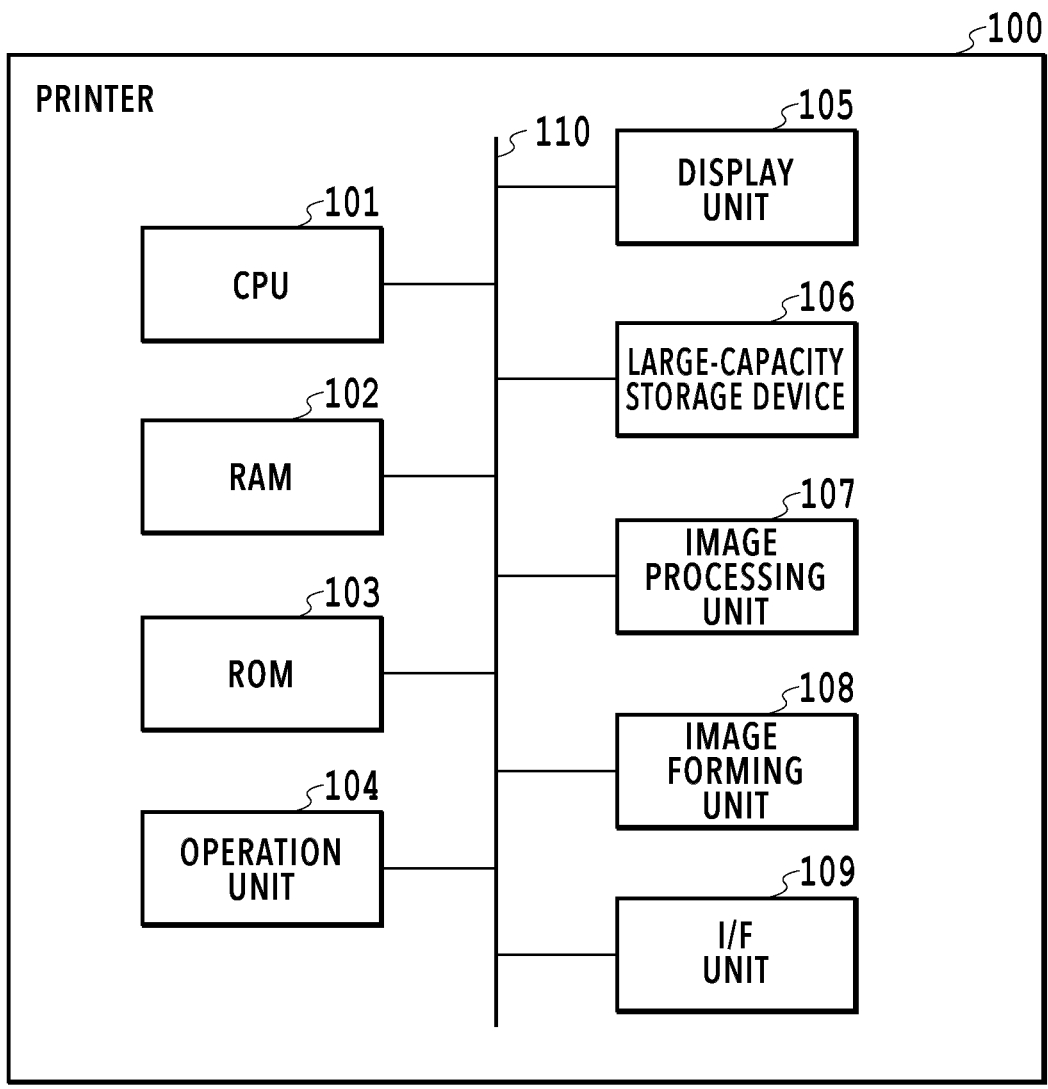
FIG. 1 is a diagram showing a hardware configuration of a printer.

FIG. 1 is a diagram showing a hardware configuration of a printer including an image processing controller that can be applied to the present embodiment. A printer 100 comprises a CPU 101, a RAM 102, a ROM 103, an operation unit 104, a display unit 105, a large-capacity storage device 106, an image processing unit 107, an image forming unit 108, an I/F (interface) unit 109, and a bus 110.

The CPU 101 controls the operation of the entire printer 100 by using computer programs stored in the RAM 102 and the ROM 103. Here, a case is explained as an example where the one CPU 101 controls the entire printer 100, but it may also be possible to control the entire printer 100 by dividing the processing among a plurality of pieces of hardware performing operation processing.

The RAM 102 temporarily stores computer programs and data read from the large-capacity storage device 106 and data received from the outside via the I/F unit 109. Further, the RAM 102 is used as a work area in a case where the CPU 101 and the image processing unit 107 perform processing. The ROM 103 stores setting parameters of each unit configuring the printer 100, a boot program, and the like.

The operation unit 104 is configured by a keyboard, a mouse, and the like and receives instructions of a user via the input operation by a user. The display unit 105 is configured by a liquid crystal screen and the like and can display processing results by the CPU 101 by images, characters, and the like. In a case where the display unit 105 is a touch panel capable of detecting the touch operation of a user, the display unit 105 functions as a part of the operation unit 104.

The large-capacity storage device 106 is configured by, for example, an HDD (Hard Disk Drive) or the like and saves the OS (Operating System), programs and data for a processor, such as the CPU 101, to perform various kinds of processing, and the like. Further, the large-capacity storage device 106 stores temporary data (image data that is input and output, chart image data and dither matrix used by the image processing unit 107, and the like) generated by the processing of each unit. Programs and data saved in the large-capacity storage device 106 are read appropriately in accordance with the control by a processor, such as the CPU 101, and loaded onto the RAM 102 and become the target of various kinds of processing.

The image processing unit 107 corresponding to the above-described image processing controller is configured by a processor capable of executing programs and a dedicated image processing circuit. The image processing unit 107 generates output image data used by the image forming unit 108 by performing color conversion processing and quantization processing for the image data input as a printing target. This output image data is image data obtained by quantizing input image data of N tones into image data of M tones (N>M and in the present embodiment, M=2). Further, the image processing unit 107 also generates information (hereinafter, called "nozzle characteristic information") representing the characteristic at the time of dot formation by determining the dot formation state in a dot formation line.

The image forming unit 108 forms an image on a printing medium, such as paper, by using ink based on the output image data provided from the image processing unit 107. The image forming unit 108 of the present embodiment premises the ink jet method in which an image is formed by ejecting ink onto a printing medium from a nozzle row corresponding to each ink color. Further, it is possible for each nozzle to eject ink having three kinds of dot diameter, that is, a large dot, a medium dot, and a small dot. Here, it is assumed that in a case where image data used for print processing in the image forming unit 108 is printed on a printing medium, the size (in a case where resolution is 1,200 dpi, about 21 μm) corresponding to one pixel in the image data and the size of the medium dot are substantially equal on the printing medium. Consequently, the large dot is a dot laid out so as to be larger than the size corresponding to one pixel on a printing medium and the small dot is a dot laid out so as to be smaller than the size corresponding to one pixel on a printing medium.

The I/F unit 109 functions as an external interface for connecting the printer 100 and an external device. Further, the I/F unit 109 also functions as a communication interface for performing transmission and reception of data with an external device via a LAN, an internet, or the like. Each unit described above is connected to the bus 110 and performs transmission and reception of data via the bus 110.

(Details of Image Processing Unit)

Figure 2:
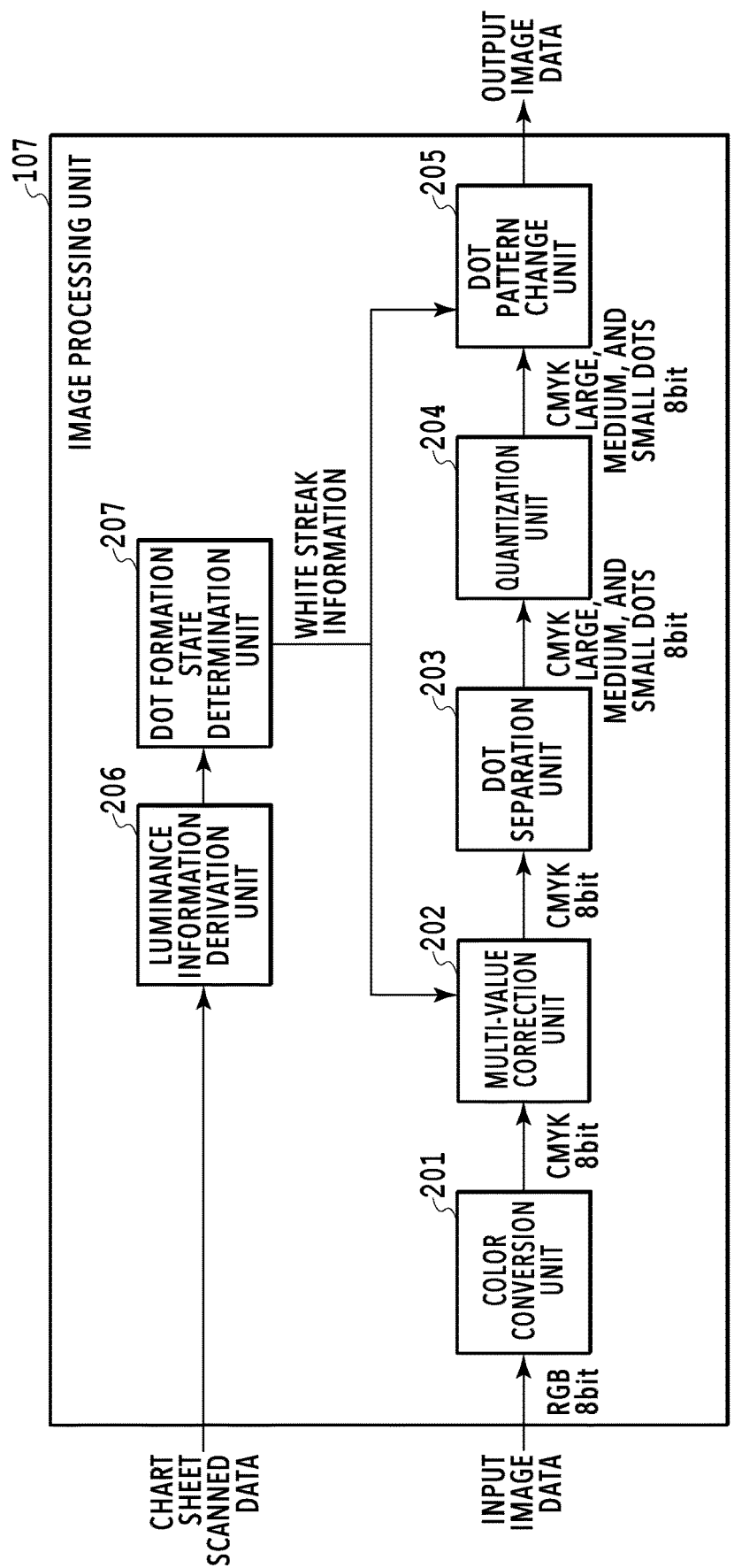
FIG. 2 is a block diagram showing an internal configuration of an image processing unit.

FIG. 2 is a block diagram showing an internal configuration of the image processing unit 107. The image processing unit 107 has a color conversion unit 201, a multi-value correction unit 202, a dot separation unit 203, a quantization unit 204, a dot pattern change unit 205, a luminance information derivation unit 206, and a dot formation state determination unit 207. In the present embodiment, printing-target image data that is input to the printer 100 is multi-value data (hereinafter, described as "RGB multi-value data") representing each pixel by eight bits (0 to 255) for each of R, G, and B and generated in a PC or the like, not shown schematically. The RGB multi-value data input to the image processing unit 107 is first input to the color conversion unit 201.

The color conversion unit 201 converts RGB multi-value data into multi-value data corresponding to ink colors used for image formation. In the present embodiment, RGB multi-value data is converted into multi-value data (hereinafter, described as "CMYK multi-value data") corresponding to each ink color of cyan (C), magenta (M), yellow (Y), and black (K). This conversion processing is performed by using a three-dimensional lookup table (LUT) stored in advance in the ROM 103.

The multi-value correction unit 202 corrects the pixel value in the CMYK multi-value data obtained by color conversion processing for each color plane in accordance with the nozzle characteristic information, which is the determination results in the dot formation state determination unit 207, to be described later. This correction processing is performed by using a one-dimensional LUL stored in advance in the ROM 103.

The dot separation unit 203 separates the CMYK multi-value data after multi-value correction processing into multi-value data corresponding to each of the plurality of dot diameters for each color plane. In the present embodiment, separation is performed into multi-value data (hereinafter, described as "by-dot diameter multi-value data") corresponding to each of the three kinds of dot diameter, that is, the large dot, the medium dot, and the small dot. This separation processing is performed by using a one-dimensional LUL stored in advance in the ROM 102 of the image processing apparatus.

The quantization unit 204 quantizes the pixel value in the by-dot diameter multi-value data obtained by the dot separation processing. That is, the quantization unit 204 converts the multi-value data corresponding to each of the three kinds of dot diameter, that is, the large, medium, and small dot diameters, into data (hereinafter, described as "dot data") that represents the dot to be made on by "1" and the dot to be made off by "0". For quantization, for example, the dither method or the error diffusion method is used. In a case of the present embodiment in which separation is performed into the three kinds of dot diameter, that is, the large, medium, and small dot diameters, each piece of multi-value data for the large dot, the medium dot, and the small dot is quantized individually, but control is performed so that the pixel positions at which the large dot, the medium dot, and the small dot are formed are exclusive of one another. That is, in the quantization unit 204, dot data for each color plane is generated, which represents a dot pattern indicating which of the large dot, the medium dot, and the small dot is formed or no dot is formed for each pixel.

The dot pattern change unit 205 changes the dot pattern in the dot data obtained by the quantization processing in accordance with the nozzle characteristic information, which is the determination results in the dot formation state determination unit 207, to be described later. This change processing is also called white streak correction and performed by using a dot change table stored in advance in the ROM 103. The dot data after the dot pattern change is input to the image forming unit 108 as output image data to be supplied for print processing.

The luminance information derivation unit 206 derives information relating to luminance for each predetermined area by using scanned data obtained by optically reading a printing medium on which an image is printed. Specifically, the luminance information derivation unit 206 derives the luminance amount for each unit area corresponding to each nozzle and the luminance amount (hereinafter, described as "reference luminance amount") that is a reference at the time of determination of the dot formation state, to be described later. In the present embodiment, predetermined chart image data is stored in advance in the ROM 103. The chart image data is image data indicating a chart image that is used to detect a white streak of the image forming unit 108. The printing medium (hereinafter, described as chart sheet) obtained by printing the chart image data by the image forming unit 108 is taken as a reading target. Then, by reading the chart sheet by an in-line scanner or the like provided within the image forming unit 108, the scanned data used for derivation of luminance information is obtained. Details of the chart image data and details of the derivation method of luminance information will be described later. The obtained luminance information is input to the dot formation state determination unit 207.

The dot formation state determination unit 207 determines the formation state of ink dots formed by each nozzle arranged in the nozzle row based on the above-described luminance information and generates the above-described nozzle characteristic information. In the present embodiment, explanation is given by taking a case as an example where information (hereinafter, described as "white streak information") indicating whether or not a white streak occurs in a dot formation line extending in the X-direction of each nozzle is generated as the nozzle characteristic information. However, the nozzle characteristic information is not limited to this and for example, the nozzle characteristic information may be information indicating a degree of the overlap of the dot formed by ink ejected from the nozzle of interest and the dot formed by ink ejected from a neighboring nozzle of the nozzle of interest of each nozzle arranged in the nozzle row. The generated white streak information is referred to in the processing in the multi-value correction unit 202 and the dot pattern change unit 205.

It may also be possible to perform a part of the functions of each of the above-described units configuring the image processing unit 107 by an external device, such as an information processing apparatus independent of the printer 100. For example, it may also be possible to generate white streak information by an external PC in which applications corresponding to the luminance information derivation unit 206 and the dot formation state determination unit 207 are installed by acquiring scanned data of the chart sheet by a flatbed scanner.

(Details of Image Forming Unit)

Figure 3:
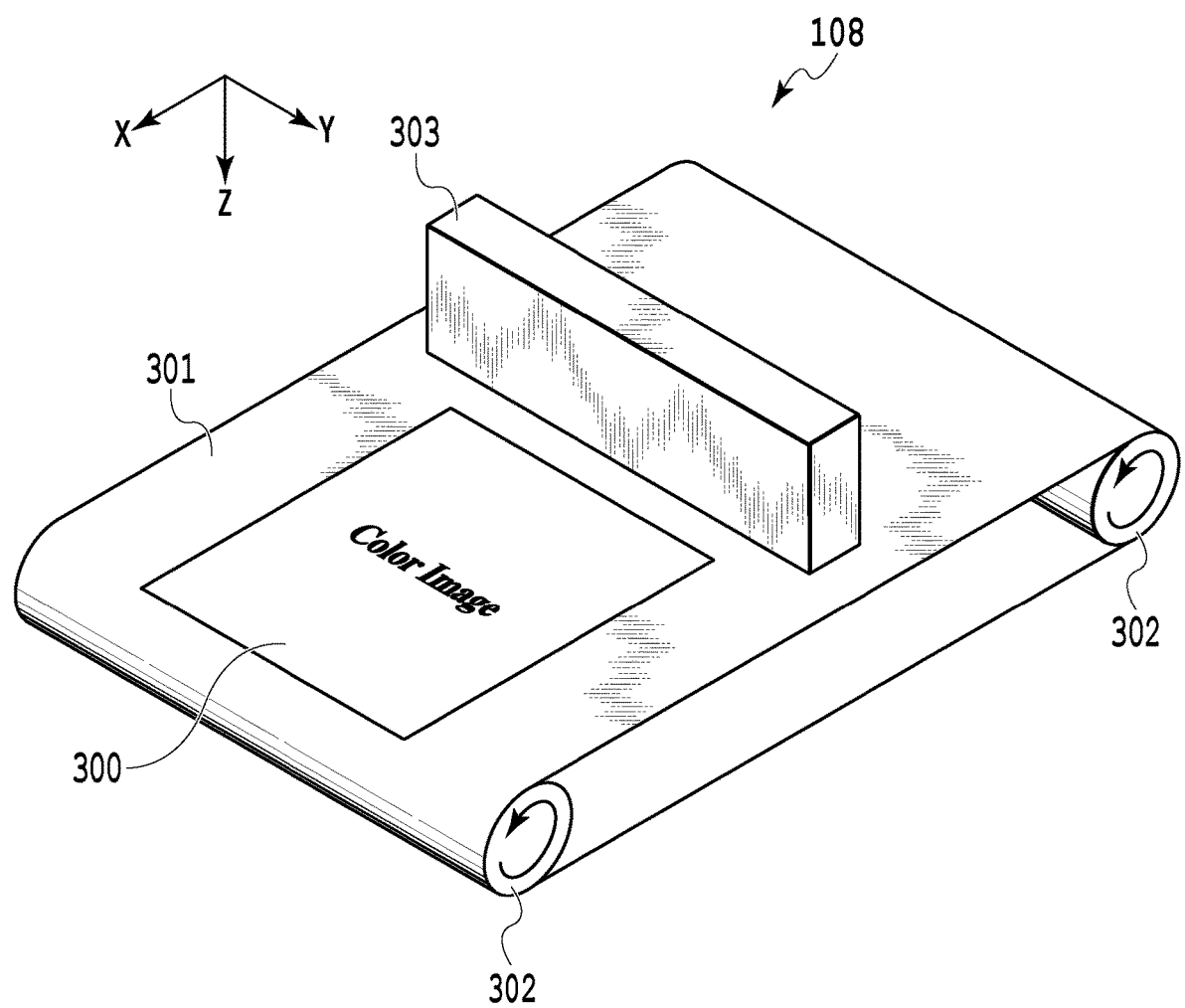
FIG. 3 is a diagram showing an outline configuration of an image forming unit.

FIG. 3 is a diagram showing an outline configuration of the so-called full-line type image forming unit 108. A printing medium 300 placed on a belt 301 is conveyed in the X-direction along with the belt 301 by the rotation of two conveyance rollers 302. On the way of the conveyance path, a print head 303 having a length corresponding to the width of the printing medium 300 is provided. To the printing medium 300 that is relatively scanned, the print head 303 ejects ink in the Z-direction in accordance with output image data (dot data) supplied from the image processing unit 107. That is, by one-time conveyance for the print head 303, a desired image is formed on the printing medium 300.

The print head 303 is configured by four nozzle rows extending in the Y-direction, which correspond to each ink color of CMYK, and on the surface facing the printing medium 300 in each nozzle row, a plurality of nozzles is arranged. In a case where the printer 100 has a resolution of, for example, 1,200 dpi, in each nozzle row, 1,200 nozzles are arranged side by side per inch. In the present embodiment, explanation is given by taking a piezo method as an example, in which each nozzle internally comprises a piezo element and ink is ejected as liquid droplets by applying a voltage to the piezo element. At this time by adjusting the shape of a voltage pulse that is applied to the piezo element, the volume of the liquid droplet that is ejected is adjusted and in the present embodiment, it is made possible to form ink dots of three sizes, that is, a large dot, a medium dot, and a small dot, on a printing medium. The kinds of dot diameter are not limited to the three kinds, that is, the large, medium, and small dot diameters, and the number of kinds may be more than three or less than three.

The present embodiment is not limited to the above-described piezo method and for example, it is also possible to apply the present embodiment also to a method in which film boiling is caused to occur in ink by applying a voltage pulse to an electrothermal transducer and the ink is ejected as droplets. At this time, on the ejection port face, the ejection port for each size may be arranged, such as the ejection port for the large dot, the ejection port for the medium dot, and the ejection port for the small dot, or a configuration may be accepted in which the dot size can be changed by modulating the voltage pulse that is applied to the electrothermal transducer. Further, in FIG. 3, the X-direction and the Y-direction intersect perpendicularly, but the conveyance direction and the nozzle arrangement direction are only required to be in an approximately perpendicular relationship.

(Flow of Print Processing)

Following the above, a flow of the entire print processing in the printer 100 is explained. In the print processing of the present embodiment, to the dot formation line corresponding to each nozzle, one of the multi-value correction processing and the dot pattern change processing is applied in accordance with the white streak information described previously. That is, for the dot formation line for which occurrence of white streak is predicted, the dot pattern (kind of dot) is changed and for the dot formation line for which occurrence of white streak is not predicted, the multi-value correction processing is performed. The reason is that the adjustment of the ink amount by increasing or decreasing the ink amount by the multi-value correction processing is an effective coping method for normal density unevenness (streak unevenness), but it is not possible to cope with the white streak, and therefore, in a case where occurrence of white streak is expected, the occurrence of white streak is prevented by changing the dot pattern.

Figure 4:
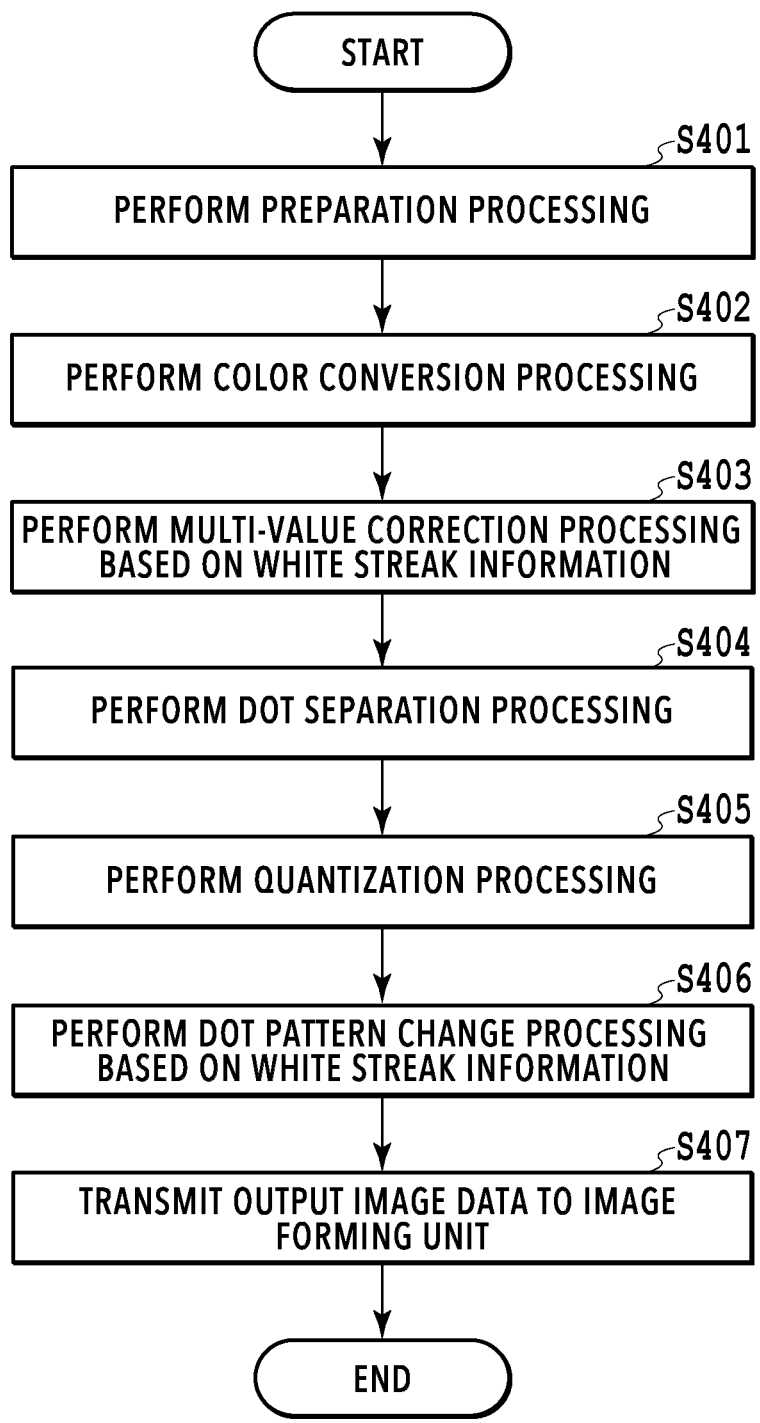
FIG. 4 is a flowchart showing a flow of print processing in the printer.

FIG. 4 is a flowchart showing a flow of the print processing in the printer 100. In a case where print data (RGB multi-value data) received via the I/F unit 109 is input to the image processing unit 107, the series of processing shown in the flowchart in FIG. 4 is started. Each step is implemented by the CPU 101 loading a program stored in the ROM 103 onto the RAM 102 and executing the program. In the following explanation, symbol "S" represents a step.

First, at S401, preparation processing for bringing about a state where it is possible for each unit within the image processing unit 107 to perform each piece of processing is performed. Specifically, various tables for color conversion, multi-value correction, dot separation, and dot pattern correction, the dither matrix for quantization and further, the white streak information described previously, and the like are read from the ROM 103 and the like and loaded onto the RAM 102.

Next, at S402, the color conversion unit 201 performs color conversion processing for the input RGB multi-value data by referring to the color conversion three-dimensional LUT and converts the RGB multi-value data into CMYK multi-value data. Each piece of processing at S403 to S406 after the color conversion processing is performed in parallel for each color plane of CMYK, and therefore, in the following the processing for only one color is explained.

Next, at S403, the multi-value correction unit 202 corrects the pixel value in the multi-value data of the processing-target color plane based on the above-described white streak information. Specifically, the correction processing using the one-dimensional LUT for multi-value correction is performed by taking the pixel value of the dot formation line as a target, for which it is not determined that a white streak occurs in the white streak information. This correction processing is processing also called density unevenness correction (shading correction) and the pixel value is increased or decreased so that the dot in the dot formation line of each nozzle has a desired density. As described previously, each pixel of the dot formation line for which occurrence of white streak is predicted, which is not the target of the correction processing at this step, is excluded from the target of this correction processing, but becomes the target of the dot pattern change processing, to be described later.

Next, at S404, the dot separation unit 203 separates the multi-value data after correction processing of the processing-target color plane into multi-value data corresponding to each of the large, medium, and small dot diameters by referring to the one-dimensional LUT for dot separation.

Next, at S405, the quantization unit 204 performs quantization processing for the multi-value data corresponding to each of the large, medium, and small dot diameters of the processing-target color plane and generates dot data representing on or off of the dot by a one-bit (binary) pixel value. In the present embodiment, the quantization processing is performed in order for the multi-value data of each of the large, medium, and small dot diameters and for the pixel already determined to be the on dot in the preceding quantization processing, exclusive control is performed so that an on dot is not arranged at the time of subsequent quantization. That is, for example, the pixel, which has been determined to be taken as an on dot in the quantization processing for the multi-value data of the large dot, is controlled so as to be an off dot in the subsequent quantization processing for the medium dot and the small dot. Due to this, dot data is generated that specifies one of four kinds of operation, that is, the large dot is formed, the medium dot is formed, the small dot is formed, and none of the large, medium, and small dots is formed, for each pixel included in the image corresponding to one page.

Next, at S406, the dot pattern change unit 205 changes the dot pattern in the dot data of each dot diameter of the processing-target color plane based on the above-described white streak information. Specifically, the dot pattern change unit 205 performs processing to replace the kind of dot set to the pixel of the dot formation line for which it has been determined that a white streak occurs in the white streak information, with a larger dot by using the above-described dot diameter change table. At this time, in a case where an off dot is set, the off dot is changed to the on dot so that the white streak whose occurrence is predicted is filled in. As described previously, the target of the dot pattern change processing is the pixel of the dot formation line for which it is predicted that a white streak occurs.

In a case where the processing up to S406 is completed for each color plane of CMYK, at S407, the dot data for each color plane of CMYK, which corresponds to each dot diameter, after the change of the dot type is performed appropriately in accordance with the white streak information is transmitted as output image data to the image forming unit 108.

The above is the flow of the print processing in the printer 100. At S406 described above, in a case where the change-target dot is the large dot, it is not possible to replace the large dot with a larger dot. In this case, it may be possible to fill in the white streak by, for example, a method of adding a dot by taking a pixel corresponding to another color plane as a target, or the like.

(Generation of White Streak Information)

Figure 5:
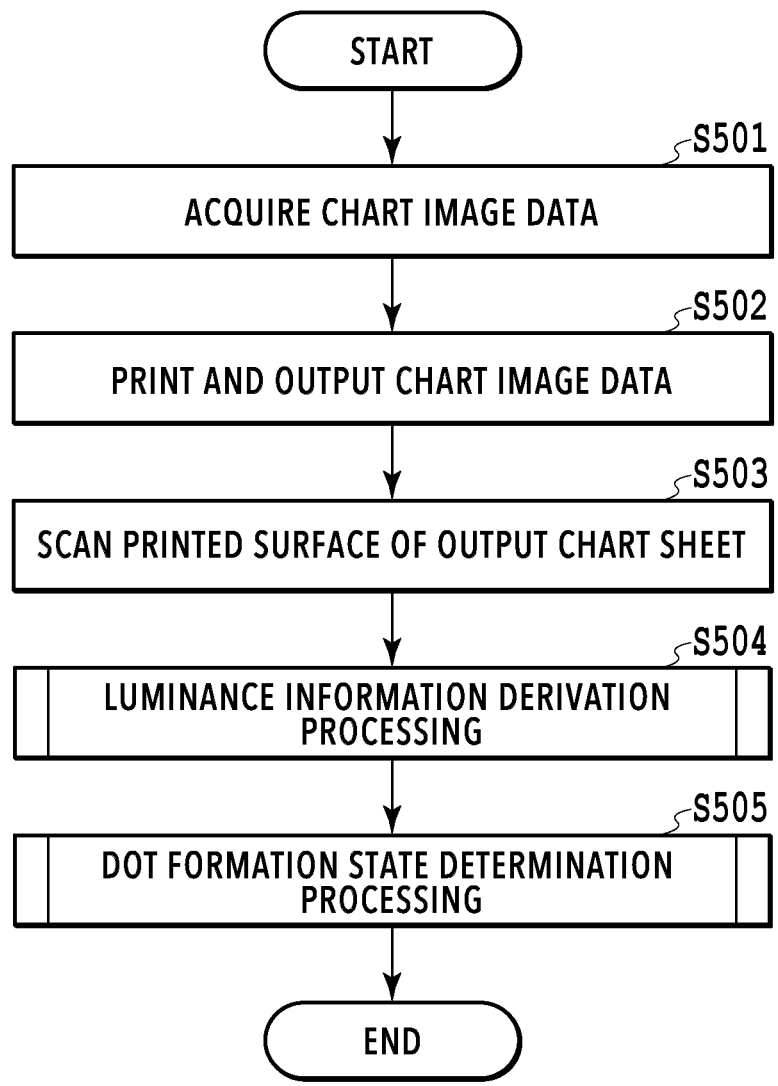
FIG. 5 is a flowchart showing a flow of processing to generate dot characteristic information.

Following the above, generation of white streak information that is referred to in the multi-value correction processing and the dot pattern change processing is explained. Generation of white steak information is performed at timing of, such as installation of the printer 100, exchange of the print head 303, and first operation of a day. FIG. 5 is a flowchart showing a flow of processing to generate white streak information as dot characteristic information according to the present embodiment. The series of processing shown in the flow chart in FIG. 4 is started based on instructions from a user or a service person. Like the flow in FIG. 4, each step is implemented by the CPU 101 loading a program stored in the ROM 103 onto the RAM 102 and executing the program. In the following explanation, symbol "S" represents a step.

Figure 6:
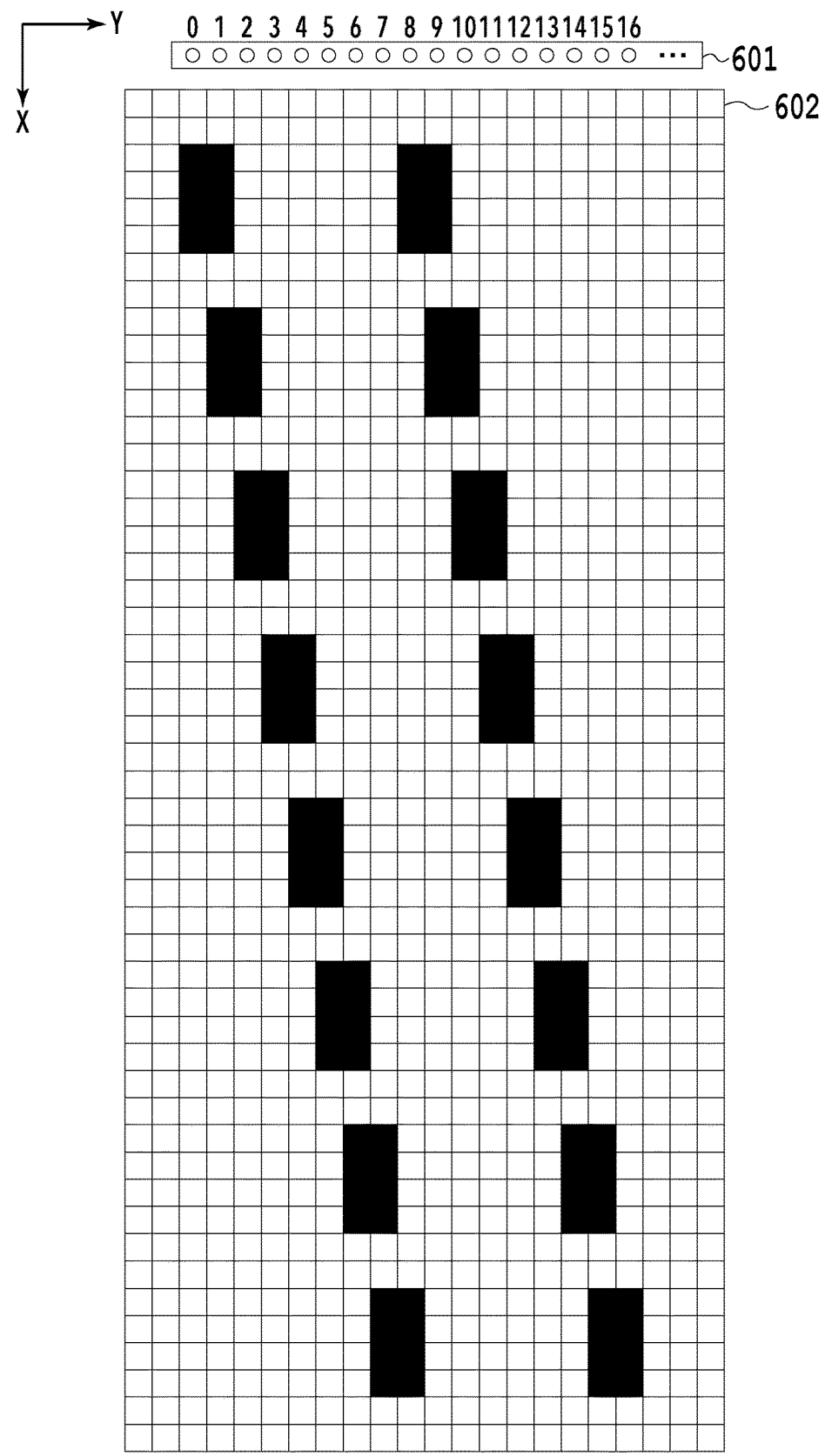
FIG. 6 is a diagram showing an example of two-dot line chart image data.

First, at S501, chart image data is read from the large-capacity storage device 106. FIG. 6 shows an example of chart image data that is used in the present embodiment. Each nozzle (numbers 0 to 16 indicating the position of each nozzle) arranged in a nozzle row 601, which simulates the face of the print head 303, and the position of each pixel arranged side by side in the nozzle row direction (Y-direction) in chart image data 602 correspond to each other. In the chart image data 602, a black rectangle represents a pixel in which a dot is formed (on dot pixel) and a white rectangle represents a pixel in which no dot is formed (off dot pixel). In a case of the chart image data 602 shown in FIG. 6, a line chart having a width of two pixels is printed on a printing medium, which is formed simultaneously by ink dots ejected from a pair of nozzles (hereinafter, called "neighboring nozzle pair") located at positions in close proximity to each other among a plurality of nozzles within the nozzle row 601. Here, a pair of nozzles configured by the nozzle of interest and the adjacent nozzle located immediately to the right thereof forms the neighboring nozzle pair. That is, a chart in which the line corresponding to the nozzle of interest and the line corresponding to one adjacent nozzle are adjacent is included. In order to simplify explanation, in the chart image data in FIG. 6, the number of nozzles is set to 17 and the number of pixels in the X-direction of each chart is set to four. However, in the actual chart image data, the number of nozzles is set to the total number of nozzles arranged in nozzle row 601. Further, the larger the number of pixels in the X-direction is, the higher the reliability of luminance calculation processing, to be described later, can be made. However, in a case where the nozzle characteristic varies or the printing environment changes during printing of the chart image data, appropriate luminance is not calculated, and therefore, it is desirable to set the number of pixels to, for example, 200 or the like.

Figure 7:
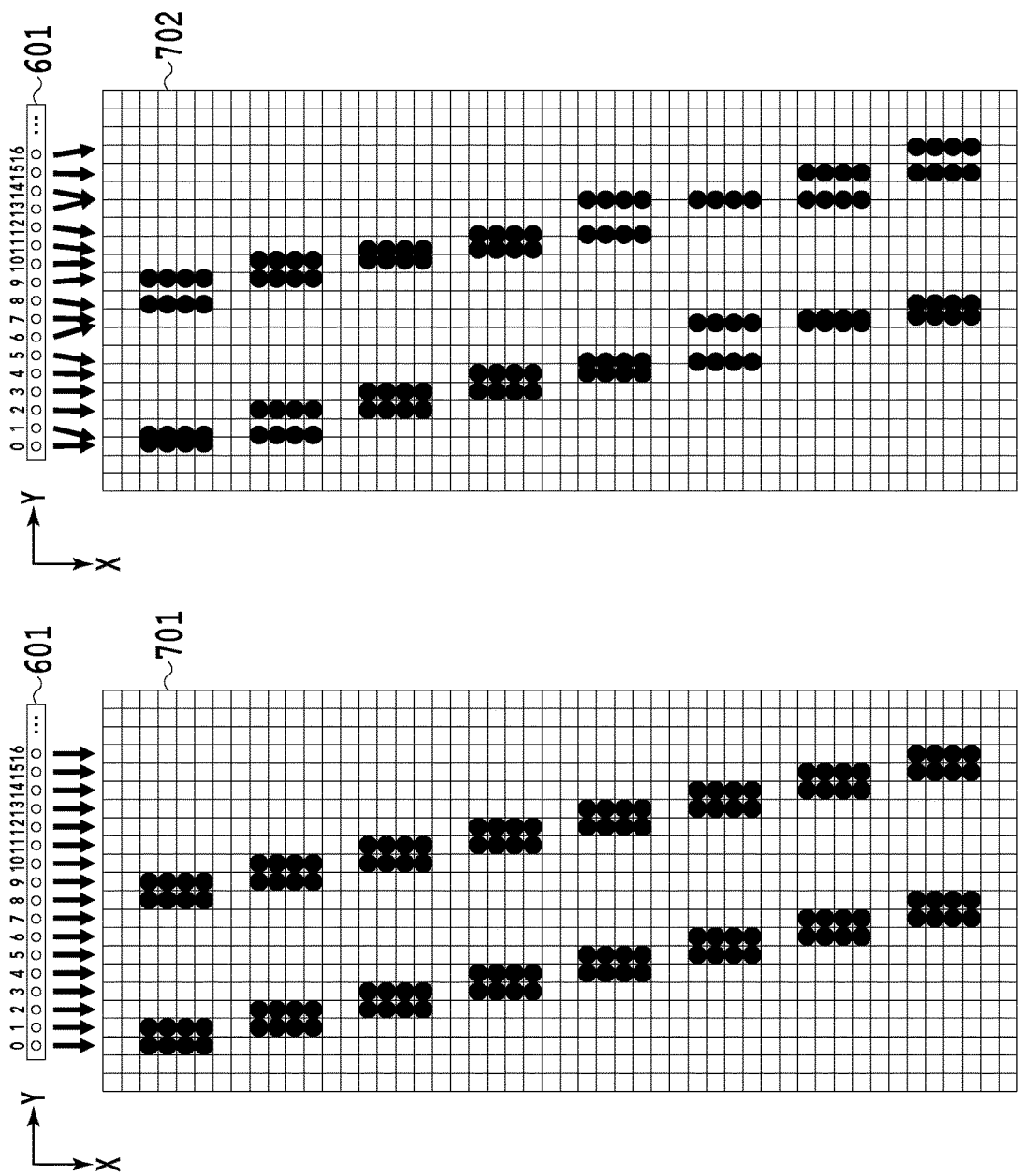
FIG. 7A and FIG. 7B are each a diagram showing an example of a chart sheet.

Next, at S502, the image forming unit 108 is instructed to print the chart image data read at S501. Upon receipt of the instructions, the image forming unit 108 performs print processing in accordance with the chart image data. At the time of printing, the dot (in the present embodiment, the medium dot) whose size is the same as the size corresponding to one pixel on a printing medium is used, and as the printing medium, the same printing medium as that at the time the final printing is performed is used. FIG. 7A and FIG. 7B each show results (hereinafter, described as "chart sheet") of printing the chart image data in FIG. 6. A chart sheet 701 in FIG. 7A represents an ideal dot formation state and a chart sheet 702 in FIG. 7B represents a state where a dot shift has occurred. Here, in the chart sheet 701, the ink droplet ejected from each nozzle of the nozzle row 601 is formed at a desired position with a desired dot diameter exactly in accordance with the chart image data. That is, the ink dot of any nozzle slightly overlaps (contacts) the ink dot of the adjacent nozzle in a similar manner and the two-dot lines are formed on the printing medium in an ideal state with a width of two pixels. On the other hand, in the chart sheet 702 in FIG. 7B, the ink dots by several nozzles largely overlap the ink dots of the adjacent nozzle, or the ink dots are completely separated from the ink dots of the adjacent nozzle, and formed at positions shifted from the desired positions specified by the chart image data. As a result of that, the two-dot line by the neighboring nozzle pair is formed on the printing medium in a variety of states, such as a state where the two-dot line becomes thin and a state where the two-dot line is separated into two one-dot lines, depending on the nozzle position. The ink dot that is formed actually on the printing medium may differ in size and shape for each nozzle, but here, the ink dots are handled on the assumption that all the ink dots have the same shape and the same size. This is based on the thinking that the influence of the variation for each nozzle can be absorbed by statistically calculating a reference luminance amount by using a luminance amount obtained for an enormous number of nozzles even in a case where the variation in size and shape of the ink dot occurs for each nozzle. In a case where the average value of the dot size shifts largely from the supposed ideal dot size, it is sufficient to adjust the reference luminance amount by taking into consideration the influence of the shift amount.

Figure 8:
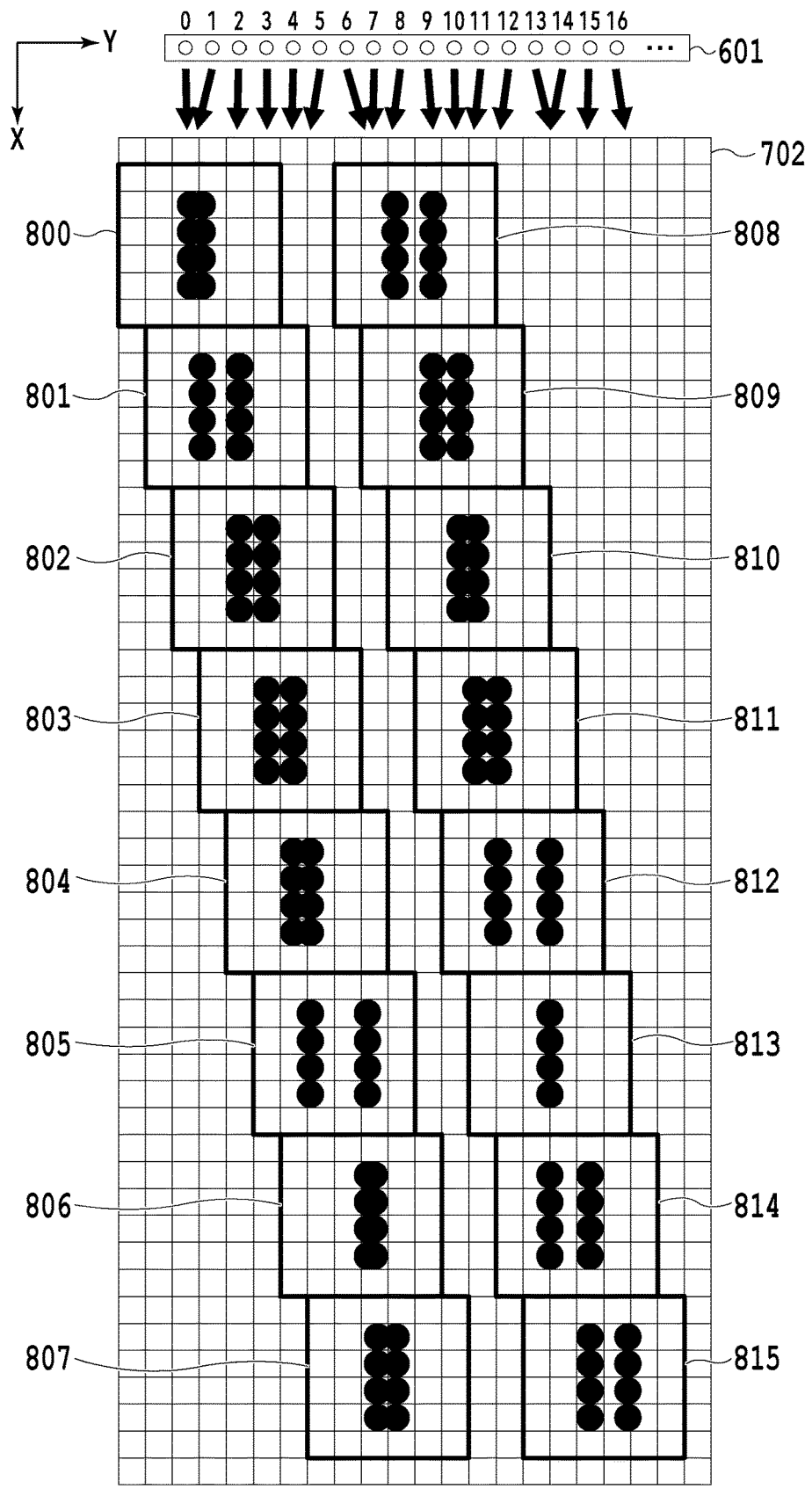
FIG. 8 is a diagram showing scanned data obtained by reading a chart sheet.

Next, at S503, the printed surface of the output chart sheet obtained at S502 is read by, for example, an in-line sensor or the like comprised within the image forming unit 108 and the scanned data representing the luminance value of the printed surface is acquired. FIG. 8 is a conceptual image of the scanned data obtained by reading the chart sheet 702 shown in FIG. 7B. In FIG. 8, thick frames 800 to 815 each indicate a unit area of 6×6 pixels including the above-described two-dot line, which correspond to the nozzle positions 0 to 16, respectively. From the scanned data of the chart sheet, it is made possible to acquire the luminance value information for each unit area shown in FIG. 8.

Next, at S504, the luminance information derivation unit 206 is instructed to perform processing to derive luminance information based on the scanned data obtained at S503. Details of the processing to derive luminance information will be described later.

Lastly, at S505, the dot formation state determination unit 207 is instructed to perform processing to determine the overlap state of dots in the dot formation line of each nozzle (at which nozzle position, the white streak occurs in the dot formation line). Details of the determination processing performed by the dot formation state determination unit 207 will be described later. Then, the results of the determination processing are stored in the large-capacity storage device as the white streak information described previously.

The above is the rough flow until the white streak information is completed according to the present embodiment. By performing the processing such as this for each nozzle row of CMYK configuring the print head 303, information highly accurately predicting the presence/absence of occurrence of white streak in units of nozzles in each nozzle row is generated. It is desirable for the dot diameter at the time of printing of chart image data to be about the same as the size corresponding to one pixel on a printing medium.

(Derivation of Luminance Information)

Following the above, the luminance information derivation processing at S504 described above is explained with reference to the flowchart in FIG. 9. In the following explanation, symbol "S" represents a step.

At S901, a variable SUM representing an accumulated luminance amount is initialized. Specifically, as the initial value of the variable SUM, "0" is set. At S902 that follows, a unit area of interest is determined from among all the unit areas 800 to 815 included in the processing-target scanned data. It may be possible to determine the unit area of interest in order from, for example, the unit area located in the top-left corner of the scanned data.

Next, at S903, the luminance value of each pixel configuring the unit area of interest determined at S902 is acquired. Then, at S904 that follows, the luminance amount for the unit area of interest is calculated. Here, the luminance amount is the total value of the luminance value of each pixel in the unit area of interest acquired at S903. In FIG. 8, in a case where the luminance amount of the unit area 800 in which the two dot groups (one dot group is configured by four ink dots aligned in the X-direction) overlap is compared with that of the unit area 801 in which the two dot groups are separate, the luminance amount is large in the unit area 800. The reason is that in a case where it is premised that a rise in density does not occur in the overlap portion even though the ink dots overlap, the area of the unit area 800, in which the ink droplets stick onto the printing medium, is smaller (blank area is large). It is known that the darker the color is, such as black, cyan, and magenta, the more unlikely a rise in density occurs even though the ink dots overlap.

At S905, the luminance amount for the unit area of interest, which is calculated at S904, is added to the variable SUM representing the accumulated luminance amount. Then, at S906, whether or not the processing for all the unit areas 800 to 815 included in the processing-target scanned data has been completed is determined. In a case where there is an unprocessed unit area, the processing returns to S902, and the next unit area of interest is determined and the processing is continued. In a case where the processing for all the unit areas has been completed, the processing advances to S907.

At S907, based on the variable SUM representing the accumulated luminance value obtained by the processing so far, the reference luminance amount is determined. Here, on the assumption that the position of the ink droplet ejected from each nozzle varies in accordance with the standard normal distribution whose average value is "0", the average value is found as the reference luminance amount. Specifically, the value of the variable SUM is divided by "total number of nozzles−1" and the average value of the luminance amount of each unit area of interest is found and the obtained average value is taken as the reference luminance amount. The reference luminance amount in this case is an amount that is found statistically from the number of nozzles and the more the number of nozzles is increased, the nearer the reference luminance amount becomes to the luminance amount in a case where dots are formed at ideal positions. It may also be possible to use a statistic other than the average value as the reference luminance amount. For example, it may also be possible to use an expected value, a mode, a median, or the like in accordance with the distribution of the luminance amount of the unit area corresponding to each nozzle. Further, even in a case where the average value of the dot position shifts is not "0", it may also be possible to adjust the reference luminance amount by taking into consideration the influence of the position shift amount from the average.

Lastly, at S908, the reference luminance amount determined at S907 is stored in the RAM 102 or the like along with the luminance amount of each area of interest calculated at S904.

The above is the contents of the luminance information derivation processing according to the present embodiment. As described above, the determination of the reference luminance amount premises that the density does not rise at the dot overlap portion and for the ink such as this (or the ink whose change in density at the overlap portion is small), the method of the present embodiment functions more effectively.

(Determination of Dot Formation State)

Figure 10:
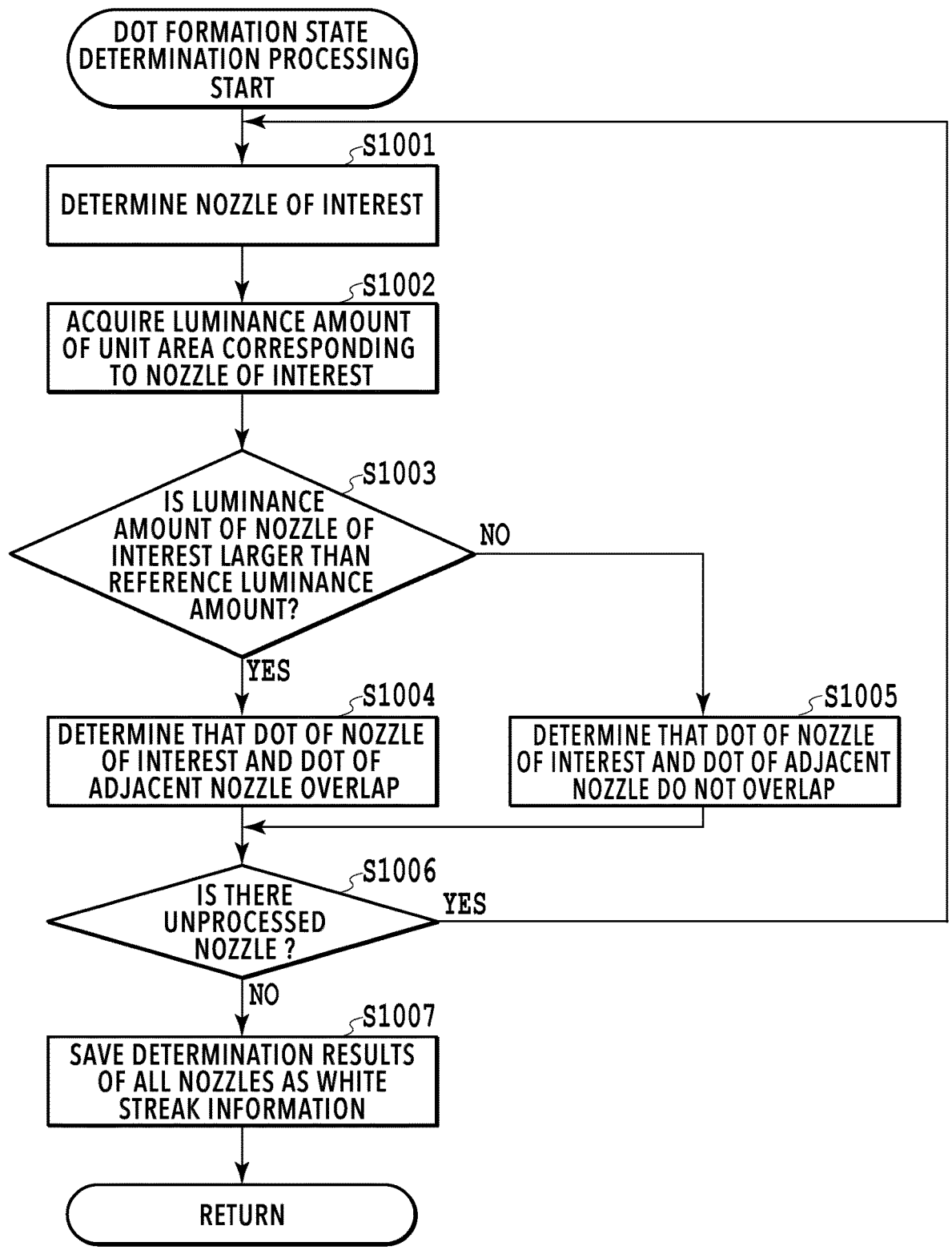
FIG. 10 is a flowchart showing details of dot formation state determination processing.

Following the above, the determination processing of the dot formation state at S505 described above is explained with reference to the flowchart in FIG. 10. In the following explanation, symbol "S" represents a step. At S1001, a nozzle of interest is determined from among all the nozzles possessed by the processing-target nozzle row. Here, it is assumed that the nozzle of interest is determined in ascending order of the numbers (0 to 16) indicating the nozzle position in the nozzle row 601 shown in FIG. 6. Specifically, at the point in time immediately after the start of the processing, an initial value of "0" is set to a variable i representing the nozzle of interest and after this, the value of the variable i is incremented and this is repeated until the value of the variable i reaches N−2 (N is the number of nozzles and the nozzle at the last end is excluded).

At S1002, the luminance amount of the unit area corresponding to the nozzle of interest is acquired from the RAM 102 or the like. At S1003 that follows, the luminance amount of the nozzle of interest and the reference luminance amount are compared and which is larger is determined. In a case where the luminance amount of the nozzle of interest is larger than the reference luminance amount, the processing advances to S1004. On the other hand, in a case where the luminance amount of the nozzle of interest is smaller than or equal to the reference luminance amount, the processing advances to S1005.

Figure 11:
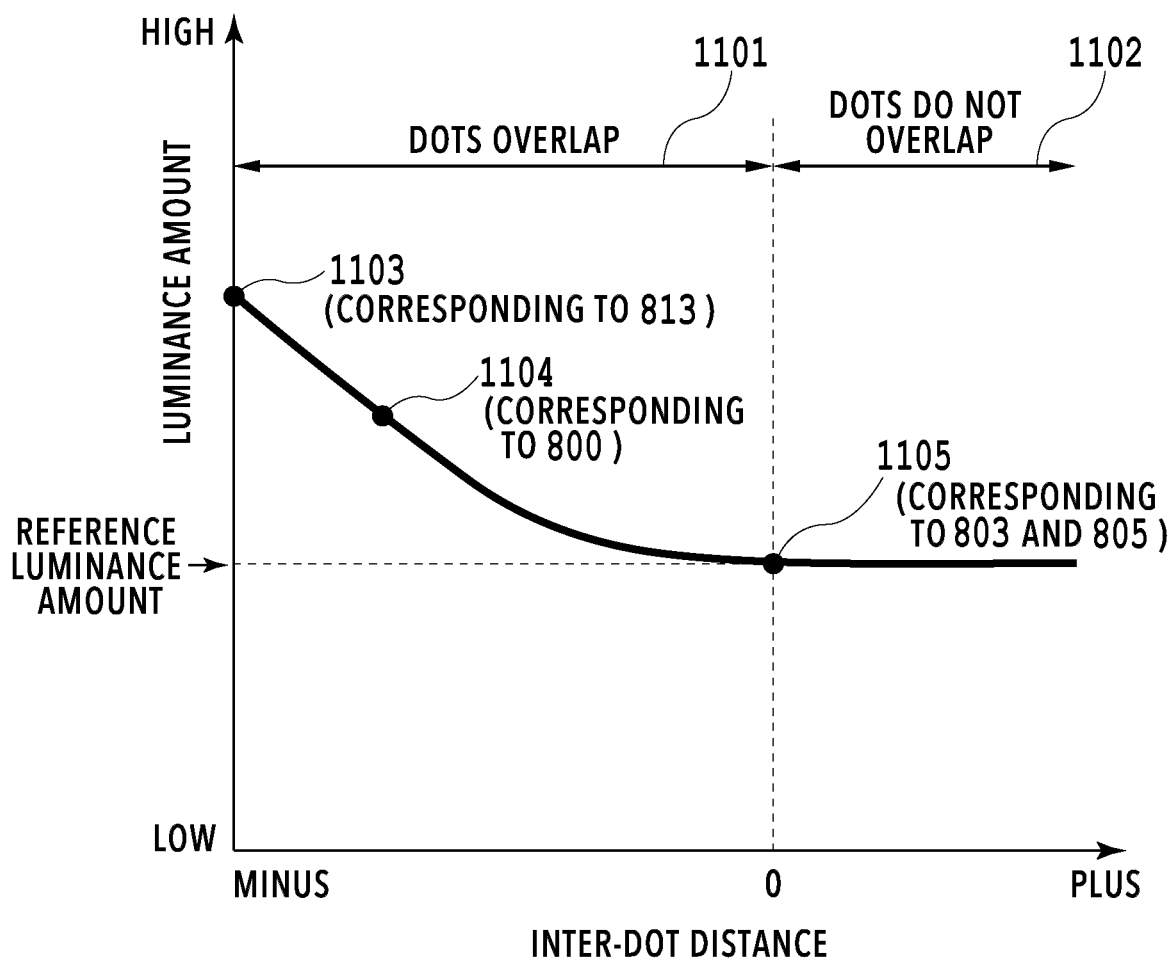
FIG. 11 is a graph representing a relationship between an inter-dot distance and a luminance amount.

At S1004, it is determined that the ink dot by the nozzle of interest (variable i) and the ink dot by the adjacent nozzle (variable i+1) to the right thereof overlap and a flag value in accordance with the determination results is set. Specifically, for example, to the nozzle of interest, "1" is assigned as the value representing that a white streak does not occur. Further, at S1005, it is determined that the ink dot by the nozzle of interest (variable i) and the ink dot by the adjacent nozzle (variable i+1) to the right thereof do not overlap and a flag value in accordance with the determination results is set. Specifically, to the nozzle of interest, "0" is assigned as the value representing that a white streak occurs. For example, in the unit area 813 in FIG. 8 described previously, the dots by the neighboring nozzle pair (nozzle positions 13 and 14) shift so that the dots come close to each other from the desired positions and are formed so as to overlap completely as if it were formed by a single nozzle. Further, in the unit area 800 also, not so much as in the unit area 813, the dots by the neighboring nozzle pair (nozzle positions 0 and 1) shift so that the dots come close to each other from the desired positions and are formed with part of dots overlapping each other. On the other hand, in the unit area 803, each of the dots by the neighboring nozzle pair (nozzle positions 3 and 4) is formed at a desired position. Further, in the unit area 805, the dots by the neighboring nozzle pair (nozzle positions 5 and 6) are formed so that the dots are separated from each other. As is known by comparing each unit area, the higher the degree of overlap of dots is, the more the black area that occupies the unit area decreases and in a case where the dots are separated, the black area does not change. Then, in a case of the ink whose density does not rise even though the ink dots overlap, the smaller the black area is, the larger the luminance amount is. FIG. 11 is a graph representing a relationship between the inter-dot distance and the luminance amount at this time and the vertical axis represents the luminance amount of each unit area and the horizontal axis represents the inter-dot distance. In a section 1101 in which the inter-dot distance is negative, as the inter-dot distance approaches zero, the luminance amount becomes smaller and in a section 1102 in which the inter-dot distance is positive, the luminance amount does not change and remains constant. A point 1103 corresponds to the unit area 813, a point 1104 corresponds to the unit area 800, and a point 1105 corresponds to the unit areas 803 and 805. In the present embodiment, a value at the time at which the luminance amount does not change any more and remains constant is used as a threshold value (=reference luminance amount), and the presence/absence of overlap of dots is determined, that is, whether a white streak occurs in the dot formation line by each neighboring nozzle pair is determined.

Next, at S1006, whether or not the processing for all the nozzles existing in the processing-target nozzle row has been completed is determined. In a case where there is an unprocessed nozzle, the processing returns to S1001, and the next nozzle of interest is determined and the processing is continued. On the other hand, in a case where the processing for all the nozzles has been completed, the processing advances to S1007.

Lastly, at S1007, based on the determination results (flag value) of the dot formation states corresponding to all the nozzles, the white streak information corresponding to all the nozzles is generated. The white streak information thus obtained is stored in the large-capacity storage device 106.

The above is the contents of the determination processing of the dot formation state according to the present embodiment, In a case of this method that takes the luminance amount in the unit area (area of blank area) as an index, it is not possible to distinguish between the dot formation state of the unit area 803 and the dot formation state of the unit area 805. Regarding this point, it is made possible to estimate the width of the white streak that may occur by further finding a distribution of the luminance amount in the Y-direction.

As above, according to the present embodiment, a predetermined chart is printed and from the scanned image data thereof, the reference luminance amount that takes into consideration the dot formation state in the dot formation line of each nozzle is found and by using this, whether the ink dots by the neighboring nozzle pair overlap is determined. Due to this, it is possible to more accurately predict the presence/absence of occurrence of white streak on the surface of paper. Further, it is possible to perform necessary image processing based on the accurate prediction about the occurrence of white streak.

Second Embodiment

In a case where as image data for the final printing, for example, image data (image data whose ratio of high-density area is high) in which the many large dots are used is supposed, it is desirable to use the large dot also at the time of the chart printing. The reason is to obtain nozzle characteristic information that predicts occurrence of white streak more accurately, which becomes more conspicuous in the higher-density area, by making the same the printing condition between the final printing and the chart printing, Consequently, a method for predicting the presence/absence of occurrence of white streak with a high accuracy even in a case where chart printing is performed with a dot whose size is different from the size corresponding to one pixel on a printing medium is explained as a second embodiment. Explanation of the portions in common to those of the first embodiment, for example, such as the basic configuration of the image processing apparatus, is omitted or simplified and in the following, generation of nozzle characteristic information, which is a different point, is explained by taking a case as an example where the same white streak information as that of the first embodiment is generated.

The rough flow of the processing at the time of generating white streak information in the present embodiment is the same as the flow in FIG. 5 of the first embodiment. The difference from the first embodiment lies in the contents of each piece of processing. In the following, along the flowchart in FIG. 5, generation of white streak information in the present embodiment is explained.

Figure 12:
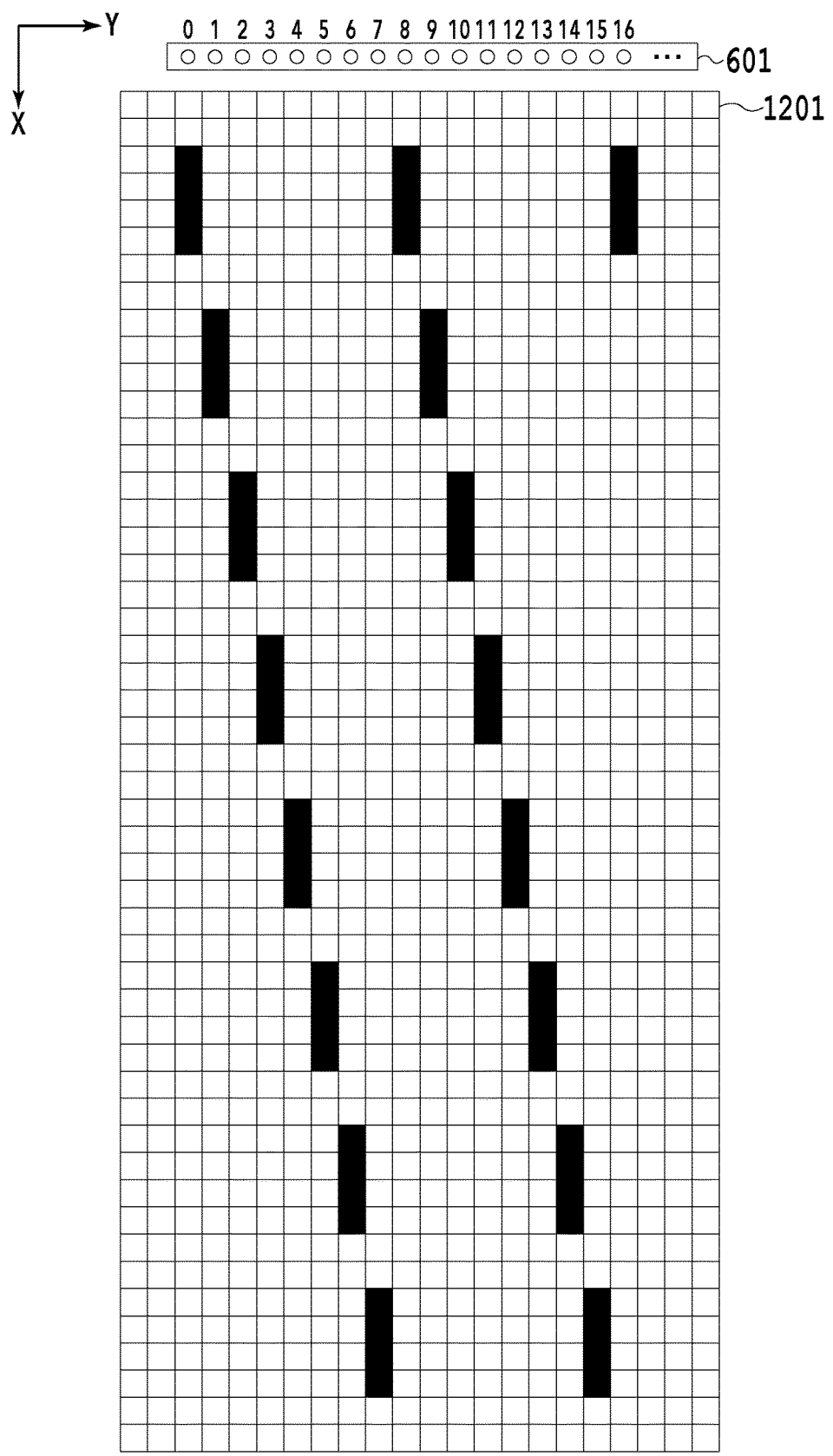
FIG. 12 is a diagram showing an example of one-dot line chart image data.

First, at S501, the CPU 101 reads chart image data from the large-capacity storage device 106. In the present embodiment, in addition to the chart image data of the two-dot line shown in FIG. 6 described previously, chart image data of a one-dot line shown in FIG. 12 is also read. Also in a case of the chart image data in FIG. 12, each nozzle (numbers 0 to 16 indicating the position of each nozzle) arranged in the nozzle row 601, which simulates the face of the print head 303, and the position of each pixel arranged side by side in the nozzle row direction (Y-direction) in chart image data 1201 correspond to each other. Further, a black rectangle represents a pixel in which a dot is formed (on-dot pixel) and a white rectangle represents a pixel in which no dot is formed (off-dot pixel). In a case of the chart image data 1201 shown in FIG. 12, the chart of the one-dot line formed by the ink dot of each nozzle arranged in the nozzle row 601 is printed on a printing medium. In actual chart image data, it is desirable to set the number of nozzle to the total number of nozzles arranged in the nozzle row 601 and the number of pixels in the X-direction to the number of pixels (for example, 256 pixels) sufficient to improve the reliability at the time of luminance amount calculation, to be described later, and this is the same as in the case with FIG. 6.

Figures 13A, 13B:
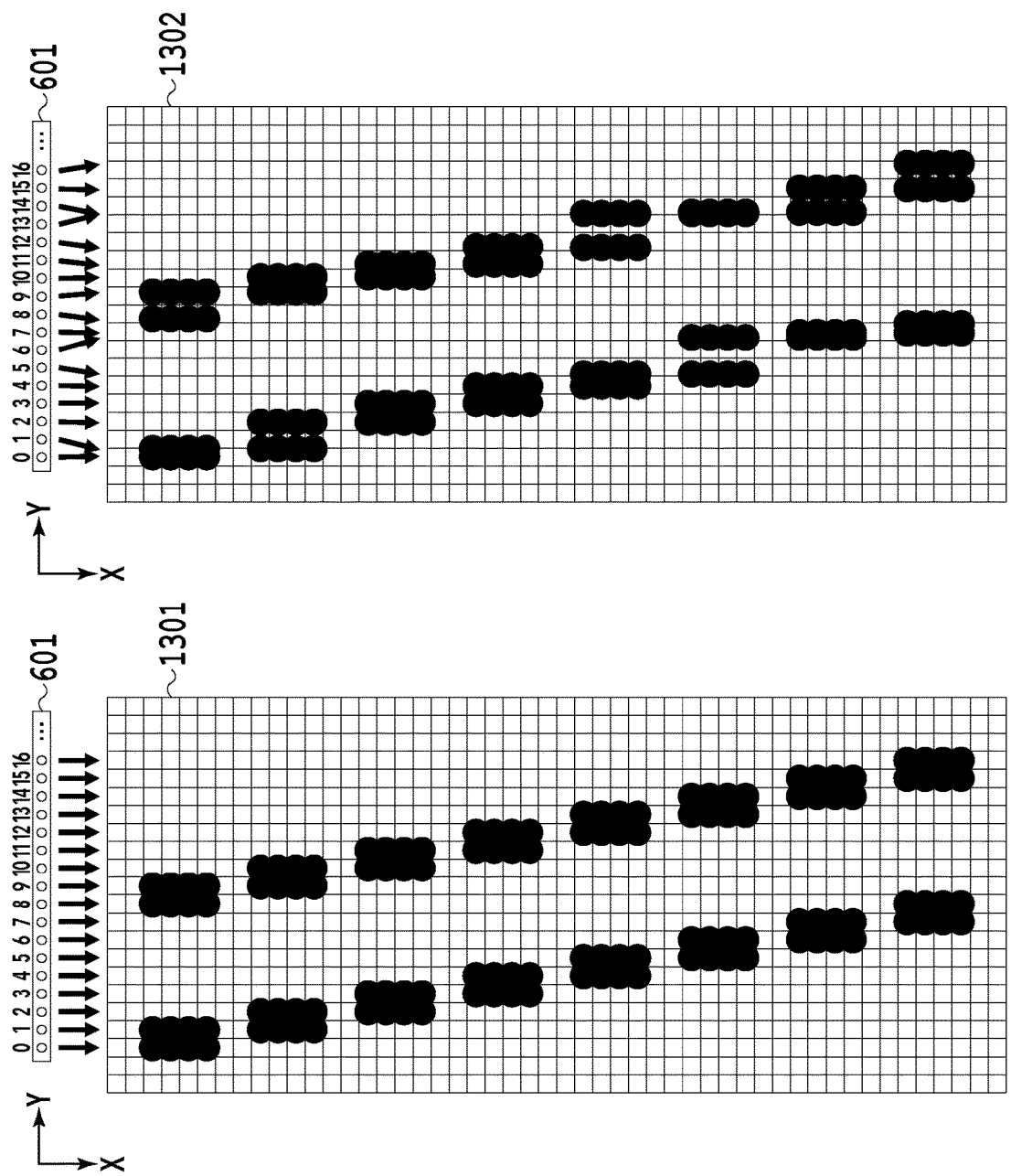
FIG. 13A and FIG. 13B are each a diagram showing an example of a chart sheet.
Figure 14:
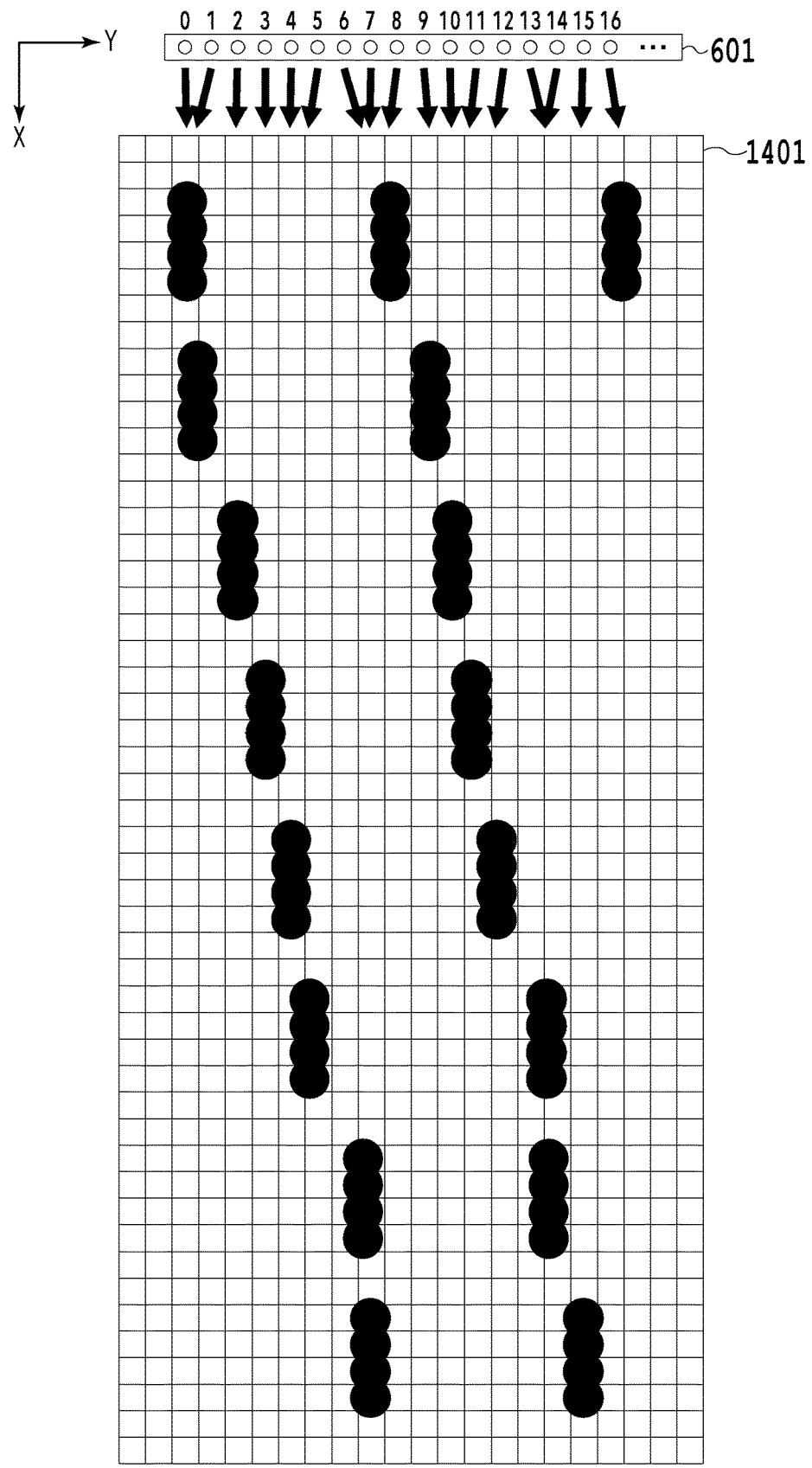
FIG. 14 is a diagram showing an example of a chart sheet.

Next, at S502, the CPU 101 instructs the image forming unit 108 to print each of the two kinds of chart image data read at S501. Upon receipt of the instructions, the image forming unit 108 performs print processing in accordance with the two kinds of chart image data in units of nozzle rows, but in the present embodiment, printing is performed with the dot (here, the large dot one size larger than the size on a printing medium, corresponding to one pixel) of a size different from the size to which one pixel corresponds on a printing medium. FIG. 13A and FIG. 13B each show a chart sheet in a case where the two-dot line chart image data in FIG. 6 is printed with the large dot. A chart sheet 1301 in FIG. 13A represents an ideal dot formation state and a chart sheet 1302 in FIG. 13B represents a state where a dot shift has occurred. As in the first embodiment, the ink dot actually formed on a printing medium may differ in size and shape for each nozzle, but for convenience of explanation, all the ink dots are shown on the assumption that they have the same shape and the same size. FIG. 14 is a chart sheet in a case where the one-dot line chart image data in FIG. 12 is printed with the large dot. It is known that the one-dot line independent for each nozzle is formed in a state where a dot shift has occurred as in FIG. 13B.

Figure 15:
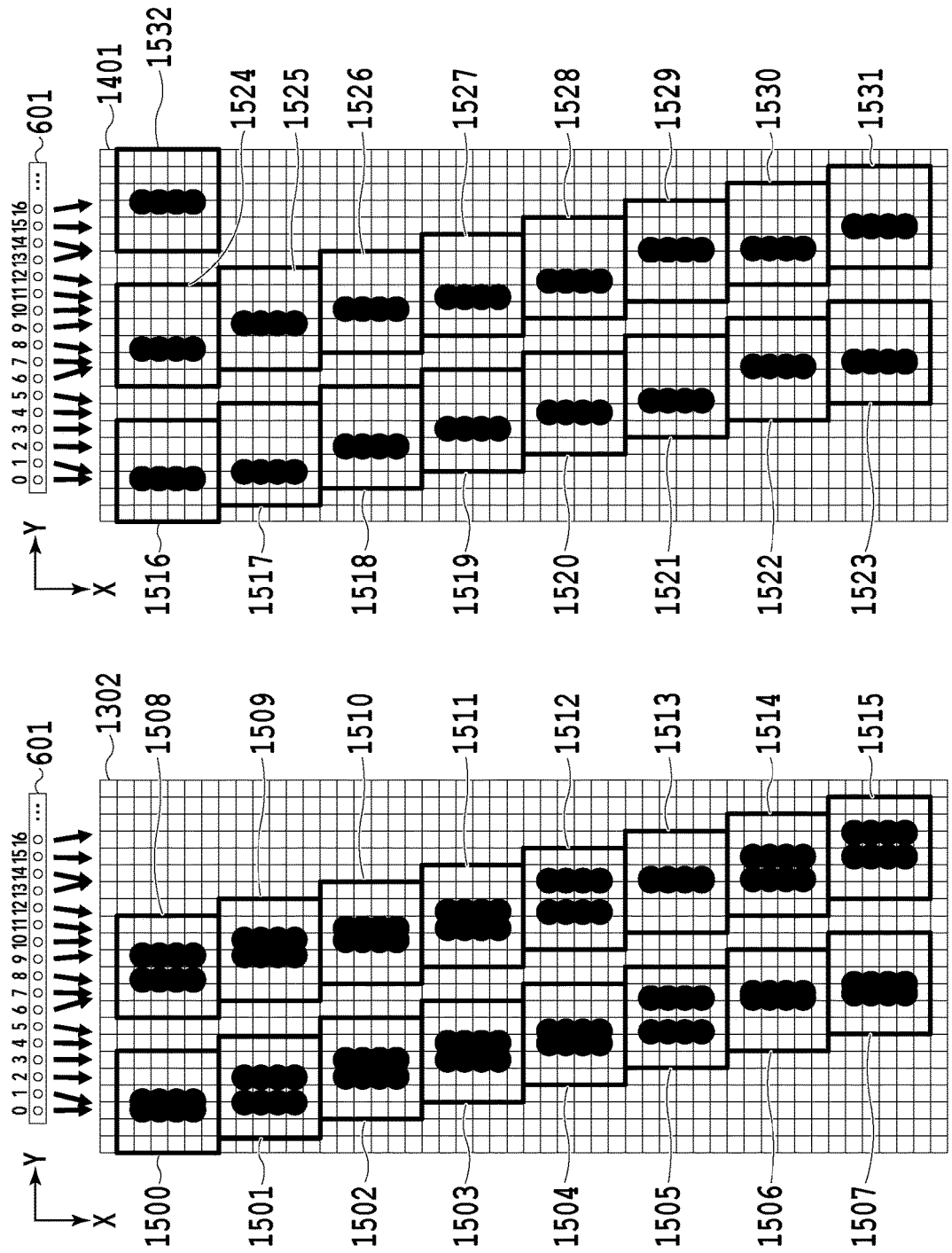
FIG. 15A and FIG. 15B are each a diagram showing scanned data obtained by reading a chart sheet.

Next, at S503, the printed surfaces of the two kinds of chart sheet obtained at S502 are read by, for example, an in-line sensor or the like comprised within the image forming unit 108 and the scanned data representing the luminance value of the printed surface is obtained. FIG. 15A is a conceptual diagram of the scanned data obtained by reading the chart sheet 1302 shown in FIG. 13B. In FIG. 15A, thick frames 1500 to 1515 each indicate the unit area of 6×6 pixels including the above-described two-dot line, corresponding to each of the nozzle positions 0 to 16. FIG. 15B is a conceptual diagram of the scanned data obtained by reading a chart sheet 1401 shown in FIG. 14. In FIG. 15B, thick frames 1516 to 1532 each indicate the unit area of 6×6 pixels including the one-dot line, corresponding to each of the nozzle positions 0 to 16. At the next step, the luminance information is acquired based on the two kinds of scanned data shown in FIG. 15A and FIG. 15B.

Next, at S504, the luminance information derivation unit 206 is instructed to perform the derivation processing of the luminance information using the two kinds of scanned data obtained at S503. Details of the luminance information derivation processing will be described later.

Lastly, at S505, the dot formation state determination unit 207 is instructed to perform the processing to determine the dot overlap state in the dot formation line of each nozzle. This determination processing is quite the same as that of the first embodiment, and therefore, explanation is omitted.

Then, the results of the determination processing are stored in the large-capacity storage device 106 as the white streak information.

The above is the rough flow until the white streak information is generated according to the present embodiment.

(Derivation of Luminance Information)

Figure 16:
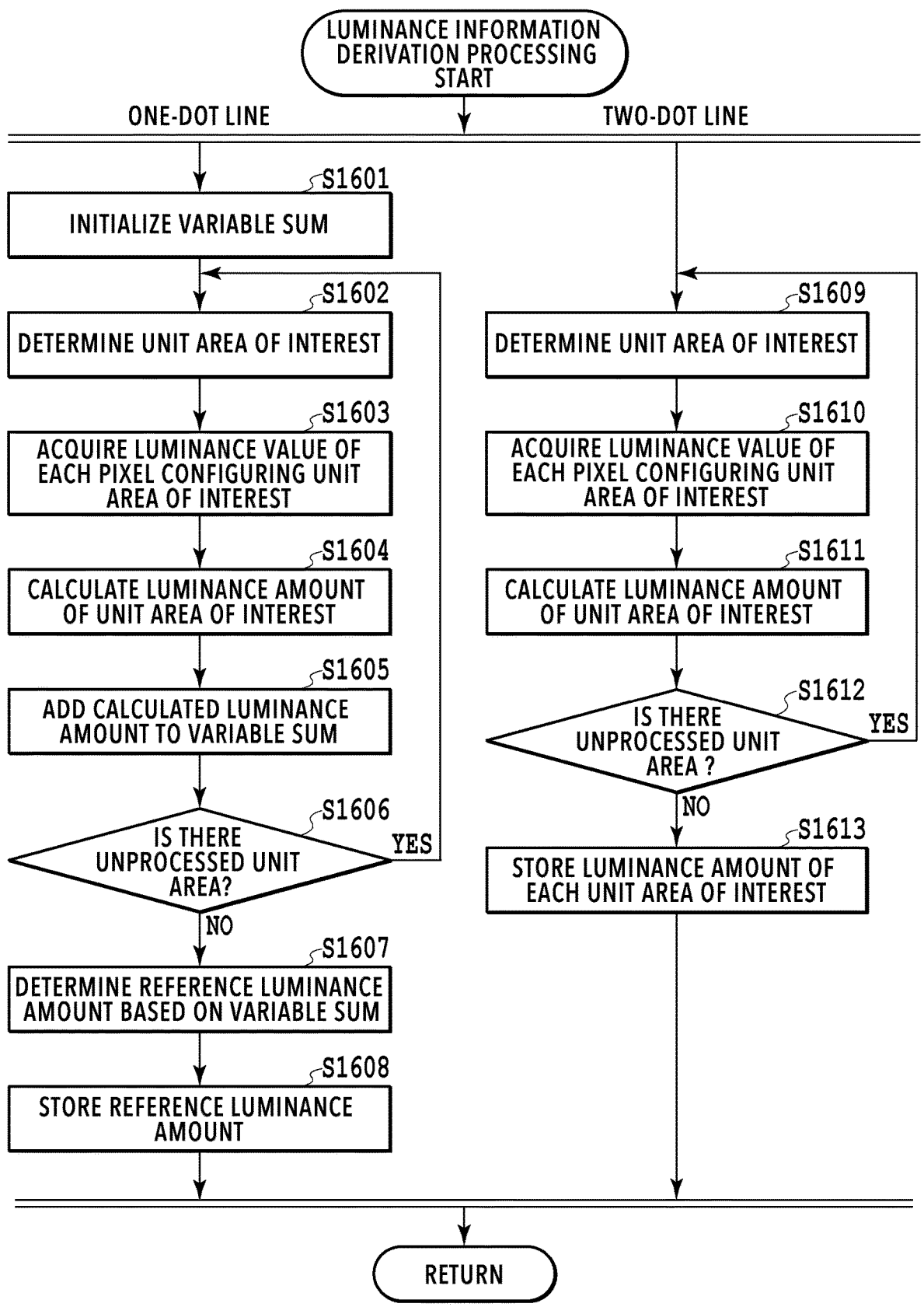
FIG. 16 is a flowchart showing details of luminance information derivation processing according to a second embodiment.

Following the above, the luminance information derivation processing according to the present embodiment is explained with reference to the flowchart in FIG. 16. In the following explanation, symbol "S" represents a step. A large difference from the first embodiment lies in that the two kinds of scanned data shown in FIG. 15A and FIG. 15B are used. First, of all the steps of S1601 to S1613, S1601 to S1608 are performed by taking the scanned data of the one-dot line chart sheet as a target (hereinafter, called "first processing"). Then, the rest of the steps, that is, S1609 to S1613 are performed by taking the scanned data of the two-dot line chart sheet as a target (hereinafter, called "second processing"). Here, explanation is given on the assumption that the first processing and the second processing are performed in parallel. Of course, it may also be possible to perform the processing at the point in time the other processing is completed. First, the first processing that takes the one dot-line scanned data as a target is explained.

Figure 9:
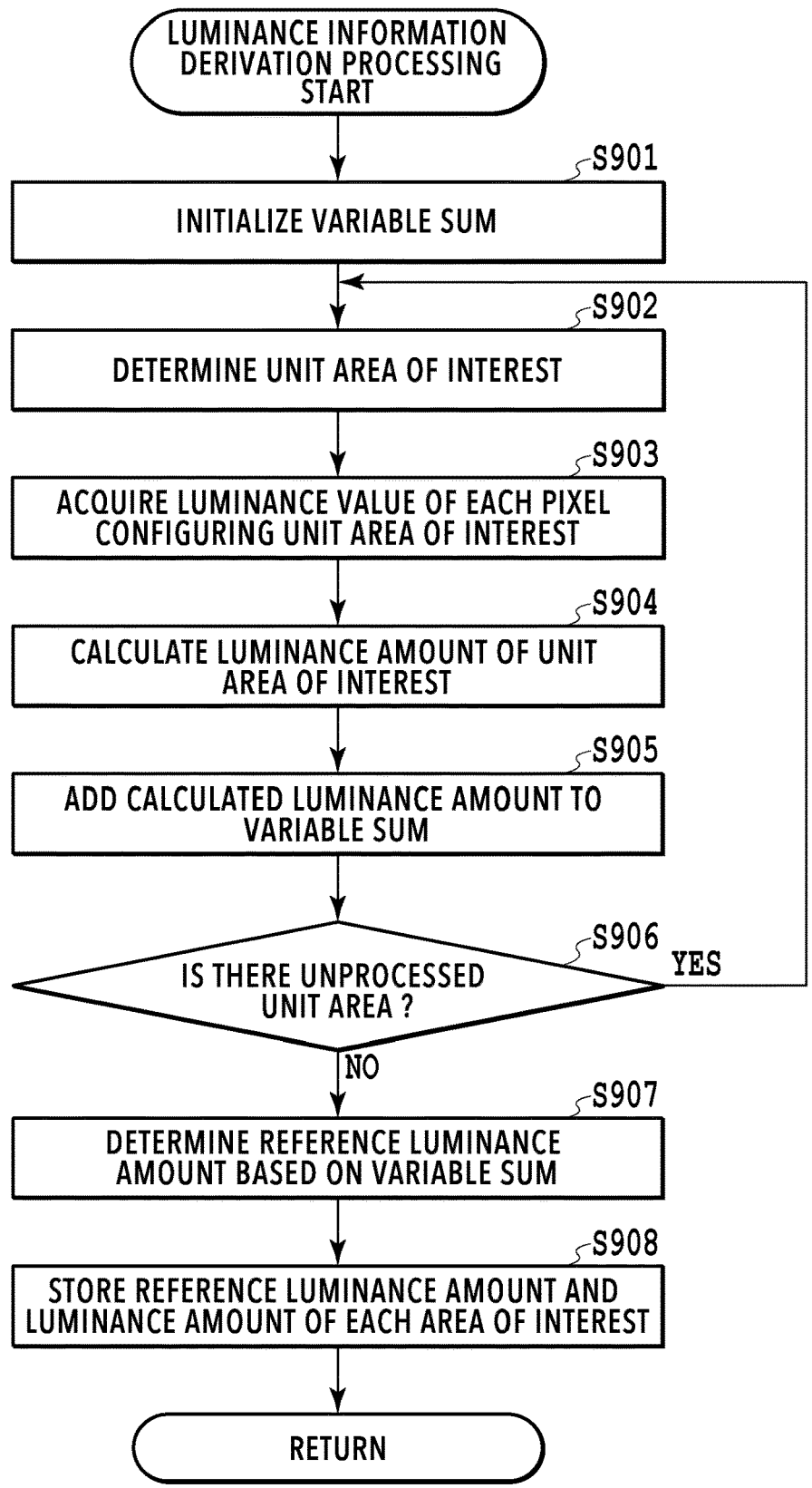
FIG. 9 is a flowchart showing details of luminance information derivation processing according to a first embodiment.

Each piece of processing in the first processing is basically the same as each piece of processing at S901 to S908 in the flow in FIG. 9 of the first embodiment. First, the variable SUM representing the accumulated luminance amount is initialized, that is, "0" is set as the initial value of the variable SUM (S1601). Following this, the unit area of interest is determined from among all the unit areas 1516 to 1532 included in the processing-target one-dot line scanned data (S1602). Next, the luminance value of each pixel configuring the determined unit area of interest is acquired (S1603). Then, as the luminance amount of the unit area of interest, the total value of the luminance value of each pixel in the unit area of interest is calculated (S1604). Next, the calculated luminance amount of the unit area of interest is added to the variable SUM representing the accumulated luminance amount (S1605). Then, the processing is continued until the processing for all the unit areas 1516 to 1532 included in the processing-target scanned data is completed (S1606). Then, based on the variable SUM representing the accumulated luminance amount obtained by the processing so far, the reference luminance amount is determined (S1607). In the present embodiment, a value obtained by dividing the value of the variable SUM by the number of nozzles N and further doubling the obtained quotient (average value of the luminance amount of each nozzle) is taken to be the reference luminance amount. The value obtained from the one-dot line is the average value of the luminance amount in units of nozzles, and therefore, the value is doubled so as to correspond to the two-dot line. Lastly, the reference luminance amount determined at S1607 is stored in the RAM 102 or the line (S1608). The above is the contents of the first processing. Following the above, the second processing is explained.

Each piece of processing in the second processing corresponds to each piece of processing at S902, S903, S904, and S906 in the flow in FIG. 9 of the first embodiment. First, the unit area of interest is determined from among all the unit areas 1500 to 1515 included in the processing-target two-dot line chart sheet (S1609). Next, the luminance value of each pixel configuring the determined unit area of interest is acquired (S1610). Then, as the luminance amount of the unit area of interest, the total value of the luminance value of each pixel in the unit area of interest is calculated (S1611). Then, the processing is continued until the processing for all the unit areas 1500 to 1515 included in the processing-target scanned data is completed (S1612). Then, the luminance amount of each area of interest calculated at S1611 is stored in the RAM 102 or the like (S1613).

The above is the contents of the luminance information derivation processing according to the present embodiment.

(Determination of Dot Formation State)

Following the above, the determination processing (S505) of the dot formation state in the present embodiment is explained. The operation itself of the determination processing is quite the same as that of the first embodiment, and therefore, here, differences in a case where the large dot is used at the time of chart printing are explained mainly.

Figure 17:
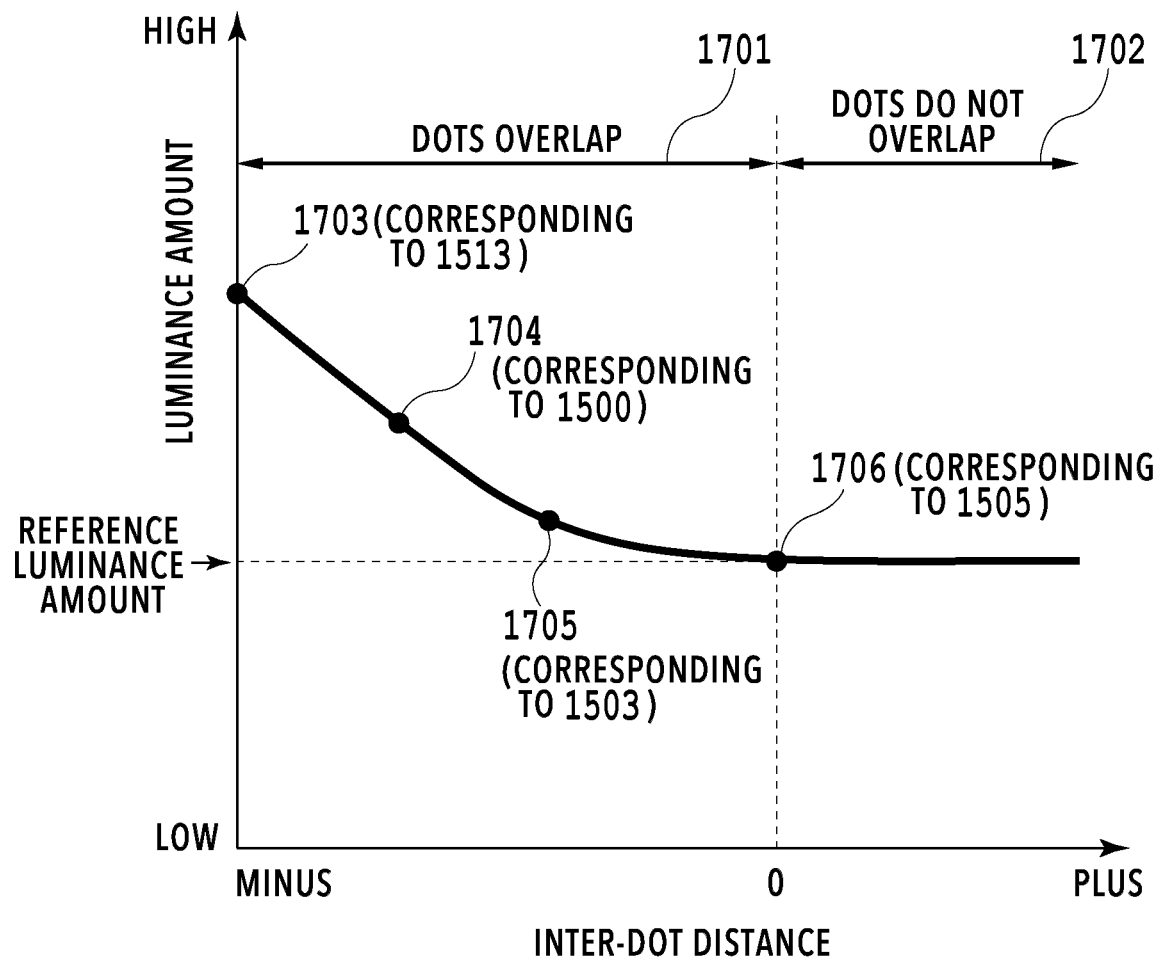
FIG. 17 is a graph representing a relationship between an inter-dot distance and a luminance amount.

First, in the unit area 1513 in FIG. 15A, as in the unit area 813 in FIG. 8, the dots by the neighboring nozzle pair (nozzle positions 13 and 14) shift so that the dots come close to each other from the desired positions and the dots overlap completely as if it were dot formation by a single nozzle. Further, in the unit area 1500 also, not so much as in the unit area 1513, the dots by the neighboring nozzle pair (nozzle positions 0 and 1) shift so that the dots come close to each other from the desired positions and are formed with part of dots overlapping each other. On the other hand, in the unit area 1503, the dots by the neighboring nozzle pair (nozzle positions 3 and 4) are formed at the desired positions respectively so that the dots overlap with a predetermined distance being kept. Further, in the unit area 1505, the dots by the neighboring nozzle pair (nozzle positions 5 and 6) are formed so that the dots are separated more than a predetermined distance. As is known by comparing each unit area, as in the case in FIG. 8 of the first embodiment, the higher the degree of overlap of dots is, the more the black area that occupies the unit area decreases and in a case where the dots are separated with no overlap, the black area does not change. Then, in a case of the ink whose density does rise even though the dots overlap, the smaller the black area is, the larger the luminance amount is. At this time, in the dot formation state in the unit area 1503 in which the large dots are formed at the aimed positions, the degree of overlap of dots is not low and the state is not a state (contact state) in which the dots overlap slightly as in the unit area 803 in FIG. 8. Because of this, in the present embodiment, chart printing by the one-dot line chart image data is performed and the average value of the luminance amount of the unit area corresponding to each nozzle is found based on the scanned data of the chart sheet, and then, a value obtained by doubling the average value is taken to be the reference luminance amount. By using the reference luminance amount such as this, it is made possible to determine whether or not the large dots formed by the nozzles adjacent to each other contact. FIG. 17 is a graph representing a relationship between the inter-dot distance and the luminance amount at this time and the vertical axis represents the luminance amount of each unit area and the horizontal axis represents the inter-dot distance. Like FIG. 11 of the first embodiment, in a section 1701 in which the inter-dot distance is negative, as the inter-dot distance approaches zero, the luminance amount becomes smaller and in a section 1702 in which the inter-dot distance is positive, the luminance amount does not change and remains constant. A point 1703 corresponds to the unit area 1513, a point 1704 corresponds to the unit area 1500, a point 1705 corresponds to the unit area 1503, and a point 1706 corresponds to the unit area 1505. Then, in the present embodiment, the reference luminance amount (twice the average value of the luminance amount in units of nozzles) determined as described above is taken as a threshold value and the presence/absence of overlap of dots, that is, whether a white streak occurs in the dot formation line by the neighboring nozzle pair is determined.

The above is the contents of the determination processing of the dot formation state according to the present embodiment. Here, explanation is given by taking the case as an example where chart printing is performed with the large dot one size larger than the size corresponding to one pixel on a printing medium. However, it is also possible to apply the present embodiment similarly even in a case of the small dot one size smaller than the size corresponding to one pixel on a printing medium. However, the dots being in contact with each other in a plurality of neighboring nozzle pairs within the nozzle row will be the requisites.

As above, according to the present embodiment, even in a case where chart printing is performed with the dot whose size is different from the size corresponding to one pixel on a printing medium, it is possible to accurately predict the presence/absence of occurrence of white streak.

Other Embodiments

In the first and second embodiments, the dot formation state is determined individually in units of nozzles, but the luminance amount of each unit area has the characteristic of continuously changing as is obvious from the graphs in FIG. 11 and FIG. 17. Consequently, in view of the characteristic such as this, it may also be possible to determine the dot formation state stepwise. For example, in the graph in FIG. 11, for the unit area whose luminance amount is in the range from the point 1103 to the point 1104, it is determined that the possibility of the ratio of overlap of dots in the neighboring nozzle pair being half or more is strong. Further, for the unit area whose luminance amount is in the range from the point 1104 to the point 1105, it is determined that the possibility of the ratio of overlap of dots in the neighboring nozzle pair being between half and zero, that is the contact state, is strong. In this manner, it may also be possible to perform determination by dividing into a plurality of levels.

Further, in the first and second embodiment, the two-dot line chart is printed by using one set of neighboring nozzle pairs (nozzle of interest and the adjacent nozzle immediately to the right) and the presence/absence of overlap of dots formed by each neighboring nozzle pair is determined. However, in a case where the dot size is more than twice the pitch of each nozzle arranged in the nozzle row, it may also be possible to print the two-dot line chart by a neighboring nozzle pair that is obtained by taking the nozzle of interest and a nozzle not next but next as one set.

Further, in the first and second embodiment, explanation is given by taking the full-line type ink jet printer as an example, but this is not limited. For example, the printer may be a serial type that forms an image by alternately repeating the main scan of the print head and the conveyance operation of a printing medium. In particular, in a case of the single-pass method in which image formation for the same area on the same printing medium is completed by a one-time main scan of the print head, the phenomenon, which is the problem of the present invention, occurs in the same area, and therefore, the change of the dot pattern explained in the above-described embodiment is effective. Further, also in a case of the multi-pass method in which image formation for the same area on a printing medium is completed by a plurality of main scans of the print head, on a condition that the dot formation state is different between dots formed by each individual scan, it is possible to similarly apply the above-described embodiment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to more accurately predict whether ink dots formed on the surface of paper by a plurality of nozzles arranged in a nozzle row and located at close positions overlap.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-239649, filed Dec. 21, 2018 which is hereby incorporated by reference wherein in its entirety.

What is claimed is:

1. An image processing apparatus that performs processing relating to generation of dot data specifying on or off of a dot in each pixel, the dot data being used for formation of an image by a printer forming the image on a printing medium by ejecting ink from a plurality nozzles adjacently arranged in a nozzle row direction, the image processing apparatus comprising:
   a derivation unit configured to derive, from first scanned data obtained by reading results of printing a plurality of first charts associated with a plurality of nozzles of interest among the plurality of nozzles respectively, a luminance amount for each unit area included each of the first charts and a reference luminance amount that is a statistic for combination of a nozzle of interest and the other nozzles of the plurality of nozzles; and
   a determination unit configured to determine a dot formation state in a dot formation line by the plurality of nozzles based on the luminance amount for each unit area and the reference luminance amount,
   wherein the first chart is a line chart having a width of two dots, the line chart in which an interest line corresponding to the nozzle of interest and a neighboring line corresponding to a neighboring nozzle of interest are adjacent, wherein the dot formation state is whether or not a white streak has occurred in a dot line formed by two nozzles corresponding to the unit area, wherein the reference luminance amount represents a luminance amount of the unit area where the luminance amount remains constant even in a case that the dot formation lines formed by the nozzle of interest and the neighboring nozzle are separately arranged, and wherein the reference luminance amount is determined based on an accumulated luminance value of the unit area, the accumulated luminance value representing a threshold for determining whether or not the interest line and the neighboring line are overlapped.

2. The image processing apparatus according to claim 1, wherein
the reference luminance amount is a reference at the time of the determination from the first scanned data.

3. The image processing apparatus according to claim 2, wherein
the reference luminance amount is a statistic that is one of an average value, an expected value, a mode, and a median, which are found based on the luminance amount for each unit area derived for each of the plurality of first charts.

4. The image processing apparatus according to claim 1, wherein
the first scanned data is data obtained by reading results of printing using a dot whose size is substantially the same as a size of an area corresponding to a pixel of the image on the printing medium.

5. The image processing apparatus according to claim 1, wherein
the derivation unit further derives a reference luminance amount that is a reference at the time of the determination from second scanned data obtained by reading results of printing a plurality of second charts by the printer, which is associated with a plurality of nozzles of interest among the plurality of nozzles respectively,
the determination unit performs the determination by using the luminance amount for each unit area and the reference luminance amount, and
the second chart is a line chart having a width of one dot.

6. The image processing apparatus according to claim 5, wherein
the reference luminance amount is a statistic that is one of an average value, an expected value, a mode, and a median, which are found based on the luminance amount for each unit area derived for each of the plurality of second charts.

7. The image processing apparatus according to claim 5, wherein
the first and second scanned data is data obtained by reading printing results obtained by using a dot whose size is different form a size of an area corresponding to a pixel of the image on the printing medium.

8. The image processing apparatus according to claim 1, wherein
the determination unit generates nozzle characteristic information representing a characteristic at the time of dot formation in the plurality of nozzles based on results of the determination.

9. The image processing apparatus according to claim 8, wherein
the nozzle characteristic information is information representing a characteristic at the time of dot formation in units of nozzles.

10. The image processing apparatus according to claim 8, further comprising:
a quantization unit configured to generate the dot data by performing quantization processing for multi-value image data corresponding to an ink color used in the printer;
a correction unit configured to correct a pixel value in the multi-value image data before the quantization processing is performed based on the nozzle characteristic information so that density unevenness is suppressed; and
a change unit configured to change a dot pattern in the dot data after the quantization processing is performed based on the nozzle characteristic information.

11. The image processing apparatus according to claim 10, wherein
the nozzle characteristic information is information indicating whether or not a white streak occurs in the dot formation line,
the correction unit performs correction so that a pixel in a dot formation line for which no occurrence of white streak is determined has a desired density, and
the change unit changes a kind of dot set to the pixel so that a white streak does not occur in a dot formation line for which occurrence of white streak is determined.

12. The image processing apparatus according to claim 8, wherein
the nozzle characteristic information is information indicating a degree of overlap of a dot that is formed by ink ejected from a nozzle of interest and a dot that is formed by ink ejected by a neighboring nozzle of the nozzle of interest, and
wherein the image processing apparatus further comprises:
a correction unit configured to perform correction so that a pixel in a dot formation line for which at least an overlap is determined has a desired density, and
a change unit configured to change a kind of dot set to the pixel so as to fill in a gap by a neighboring dot in a dot formation line for which no overlap is determined.

13. The image processing apparatus according to claim 1, wherein
the first scan data is scan data obtained by printing a number of the first charts corresponding to all combinations of two adjacent nozzles of the plurality of nozzles.

14. The image processing apparatus according to claim 1, wherein
the determination unit outputs determination results.

15. The image processing apparatus according to claim 1, wherein
the plurality of nozzles is nozzles that eject ink by applying a voltage to a piezo element arranged internally.

16. The image processing apparatus according to claim 1, wherein
the printer is a full-line type printer that forms an image on the printing medium by a one-time relative scan for the plurality of nozzles of the printing medium.

17. An image processing method relating to generation of dot data specifying on or off of a dot in each pixel, the dot data being used for formation of an image by a printer forming the image on a printing medium by ejecting ink from a plurality nozzles adjacently arranged in a nozzle row direction, the method comprising:

reading results of printing a plurality of charts associated with a plurality of nozzles of interest among the plurality of nozzles respectively by the printer;

deriving a luminance amount for each unit area surrounding each of the charts and a reference luminance amount that is a statistic for combination of a nozzle of interest and the other nozzles of the plurality of nozzles from scanned data obtained by reading at the reading step; and determining a dot formation state in a dot formation line by the plurality of nozzles based on the luminance amount and the reference luminance amount, wherein the chart is a line chart having a width of two dots, the line chart in which an interest line corresponding to the nozzle of interest and a neighboring line corresponding to a neighboring nozzle of interest are adjacent, wherein the dot formation state is whether or not a white streak has occurred in a dot line formed by two nozzles corresponding to the unit area, wherein the reference luminance amount represents a luminance amount of the unit area where the luminance amount remains constant even in a case that the dot formation lines formed by the nozzle of interest and the neighboring nozzle are separately arranged, and wherein the reference luminance amount is determined based on an accumulated luminance value of the unit area, the accumulated luminance value representing a threshold for determining whether or not the interest line and the neighboring line are overlapped.

18. A non-transitory computer readable storage medium storing a program for causing a computer to perform an image processing method relating to generation of dot data specifying on or off of a dot in each pixel, the dot data being used for formation of an image by a printer forming the image on a printing medium by ejecting ink from a plurality nozzles adjacently arranged in a nozzle row direction, the method comprising the steps of:

reading results of printing a plurality of charts associated with a plurality of nozzles of interest among the plurality of nozzles respectively by the printer;

deriving a luminance amount for each unit area surrounding each of the charts and a reference luminance amount that is a statistic for combination of a nozzle of interest and the other nozzles of the plurality of nozzles from scanned data obtained by reading at the reading step; and determining a dot formation state in a dot formation line by the plurality of nozzles based on the luminance amount and the reference luminance amount, wherein the chart is a line chart having a width of two dots, the line chart in which an interest line corresponding to the nozzle of interest and a neighboring line corresponding to a neighboring nozzle of interest are adjacent, wherein the dot formation state is whether or not a white streak has occurred in a dot line formed by two nozzles corresponding to the unit area, wherein the reference luminance amount represents a luminance amount of the unit area where the luminance amount remains constant even in a case that the dot formation lines formed by the nozzle of interest and the neighboring nozzle are separately arranged, and wherein the reference luminance amount is determined based on an accumulated luminance value of the unit area, the accumulated luminance value representing a threshold for determining whether or not the interest line and the neighboring line are overlapped.

* * * * *